US012526147B2

(12) United States Patent
Moreno et al.

(10) Patent No.: US 12,526,147 B2
(45) Date of Patent: *Jan. 13, 2026

(54) DIGITAL ASSET MANAGEMENT

(71) Applicant: Champ Titles, Inc., Cleveland, OH (US)

(72) Inventors: Bernardo Moreno, Westlake, OH (US); Shane M. Bigelow, Gates Mills, OH (US); Bo J. Shim, Avon, OH (US); Scott W. Barrett, Valley View, OH (US); Ian P. Lewis, Aurora, OH (US); Daniel F. Crough, Jr., Mentor, OH (US); Dante Giancola, Brecksville, OH (US)

(73) Assignee: Champ Titles, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/096,043

(22) Filed: Mar. 31, 2025

(65) Prior Publication Data
US 2025/0233747 A1 Jul. 17, 2025

Related U.S. Application Data

(63) Continuation of application No. 18/823,271, filed on Sep. 3, 2024, now Pat. No. 12,267,429, which is a (Continued)

(51) Int. Cl.
*H04L 29/06* (2006.01)
*G06F 16/23* (2019.01)
(Continued)

(52) U.S. Cl.
CPC ........ *H04L 9/3213* (2013.01); *G06F 16/2379* (2019.01); *G06Q 30/0185* (2013.01);
(Continued)

(58) Field of Classification Search
CPC ................. H04L 9/3213; H04L 9/0637; H04L 9/3242; H04L 9/3247; H04L 9/50; G06F 16/2379; G06Q 30/0185; G06Q 2220/00
See application file for complete search history.

(56) References Cited

U.S. PATENT DOCUMENTS 10,425,399 B2  9/2019  Kravitz et al.
10,700,853 B2  6/2020  Kravitz et al.
(Continued)

FOREIGN PATENT DOCUMENTS

WO       2019/071113 A1    4/2019

*Primary Examiner* — Mahfuzur Rahman
(74) *Attorney, Agent, or Firm* — Volpe Koenig

(57) ABSTRACT

A system and method are provided for issuing vehicle titles in a manner that guards against title washing using a permissioned blockchain network. Upon receiving a title issuance request, a global asset registry ledger is queried to retrieve historical vehicle data, including prior branding, liens, and registration events. A predictive validation index (PVI) is computed to assess the risk of title fraud. Based on the PVI, a proof of attestation policy is dynamically enforced via a smart contract that requires cryptographic endorsements from certified peer nodes. When sufficient attestations are received, the smart contract commits a new title issuance transaction to the blockchain and generates a digital title token linked to the vehicle identification number. The system maintains immutable audit records and supports real-time notifications, jurisdiction-specific policies, and secure integration with external systems such as dealerships and title authorities.

20 Claims, 19 Drawing Sheets

Related U.S. Application Data continuation of application No. 18/425,555, filed on Jan. 29, 2024, now Pat. No. 12,079,824, which is a continuation of application No. 17/542,204, filed on Dec. 3, 2021, now Pat. No. 11,909,881, which is a continuation of application No. 16/689,741, filed on Nov. 20, 2019, now Pat. No. 11,223,474.

(60) Provisional application No. 62/769,971, filed on Nov. 20, 2018.

(51) Int. Cl.
    *G06Q 30/018*    (2023.01)
    *H04L 9/06*    (2006.01)
    *H04L 9/32*    (2006.01)
    *H04L 9/00*    (2022.01)

(52) U.S. Cl.
    CPC .......... *H04L 9/0637* (2013.01); *H04L 9/3242* (2013.01); *H04L 9/3247* (2013.01); *G06Q 2220/00* (2013.01); *H04L 9/50* (2022.05)

(56) References Cited

U.S. PATENT DOCUMENTS

| | | |
|---|---|---|
| 10,872,381 B1 | 12/2020 | Leise et al. |
| 10,891,694 B1 | 1/2021 | Leise et al. |
| 10,949,926 B1 | 3/2021 | Call et al. |
| 11,223,474 B2 | 1/2022 | Moreno et al. |
| 11,386,498 B1 | 7/2022 | Leise et al. |
| 11,416,942 B1 | 8/2022 | Leise et al. |
| 2008/0065892 A1 | 3/2008 | Bailey et al. |
| 2014/0162598 A1 | 6/2014 | Villa-Real |
| 2016/0300234 A1 | 10/2016 | Moss-Pultz et al. |
| 2017/0147808 A1 | 5/2017 | Kravitz |
| 2018/0018723 A1 | 1/2018 | Nagla et al. |
| 2018/0019879 A1 | 1/2018 | Kravitz et al. |
| 2018/0019993 A1 | 1/2018 | Kravitz et al. |
| 2018/0309759 A1 | 10/2018 | Leibmann et al. |
| 2019/0190724 A1 | 6/2019 | Sundaresan et al. |
| 2019/0340685 A1* | 11/2019 | Wade ................. G06Q 20/4014 |
| 2020/0007322 A1 | 1/2020 | Weldemariam et al. |
| 2020/0027183 A1* | 1/2020 | Guttridge ............ G06F 16/1805 |
| 2020/0044827 A1 | 2/2020 | Snow |
| 2020/0099512 A1* | 3/2020 | Kikinis ................. H04L 9/3247 |
| 2020/0119905 A1 | 4/2020 | Revankar et al. |
| 2020/0143300 A1 | 5/2020 | Weldemariam et al. |
| 2020/0153793 A1* | 5/2020 | Kikinis ................. H04L 63/101 |
| 2020/0184556 A1* | 6/2020 | Cella ................... G06F 16/2379 |
| 2020/0219045 A1* | 7/2020 | Kikinis .............. G06Q 20/3672 |
| 2020/0250549 A1* | 8/2020 | Kikinis ................. H04L 63/164 |
| 2020/0294128 A1* | 9/2020 | Cella ..................... H04L 9/3239 |
| 2020/0394626 A1* | 12/2020 | Kikinis ................. G06Q 20/223 |
| 2021/0248514 A1* | 8/2021 | Cella ....................... G06V 20/20 |
| 2021/0342743 A1 | 11/2021 | Woolf |
| 2021/0342836 A1* | 11/2021 | Cella ......................... G06N 7/01 |
| 2021/0342946 A1 | 11/2021 | Leise et al. |
| 2022/0094549 A1 | 3/2022 | Moreno et al. |
| 2022/0366494 A1* | 11/2022 | Cella ......................... H04L 9/50 |
| 2023/0013074 A1* | 1/2023 | Kikinis ............ G06Q 20/40145 |
| 2023/0044564 A1 | 2/2023 | Jezewski |
| 2024/0005399 A1 | 1/2024 | Pellini et al. |

\* cited by examiner

```
import
core.ownum.grid.proofofclaim.TokenProce
ssor;

package base.ownum.grid;
/**
base Ownum grid blockchain smart
contracts that all Ownum's product
smart contracts (chain code) will use
**/
public class SmartContract
{
  private Response generateToken (
AuthToken, GUID, AssetID) {}
  private Response generateExpiringToken
( AuthToken, GUID, AssetID,
        Length) {}
  private Response validateToken (
AuthToken, GUID, AssetID) {}
  private Response revokeToken (
AuthToken, GUID, AssetID) {}
}
```

1102

```
import java.security.MessageDigest;
package core.ownum.grid.proofofclaim public class TokenProcessor
{
  public Response generateToken ( AuthToken, GUID, AssetID)
  {
      ResponseObj response = null;

MessageDigest md = MessageDigest.getInstance ("SHA-256");
      Try{
        if(validateAuthToken(AuthToken, GUID)
        {
            md.byte[] encodeddate =
                  digest.digest(getActionDate(GUID, AssetID);
            md.byte[] encodedGUID = digest.digest(GUID);
            md.byte[] encodedAssetID = digest.digest(AssetID);
            md.byte[] encodedPkey =
                  digest.digest(getPrivateKey(GUID));
            md.byte token = (encodedPkey + encodedGUID +
                  encodedencodeddate + encodedGUID)
            storeToken (token);
        };
        else
        {
            response =    "token is invalid";
        }
      }
      Catch (Exception ex){
          reponse = "there was error validate Authoken";
      }

Return response;
  }
  public Response validateToken ( AuthToken, GUID, AssetID) {}
  public Response revokeToken ( AuthToken, GUID, AssetID) {} private bool validateAuthToken(AuthToken, GUID)
  {
      bool result = false;
      //Validate AuthToken = GUID
      return result;
  }
  private string getActionDate(GUID, AssetID)
  {
      //lookup date when GUID was issued claim of AssetID)
      return format(datestring); //yyymmdd
  }
  private string getPrivateKey(GUID)
  {
      //Retrieve member private key
      return memberPrivateKey;
  }
}
```

```
"Header"
{"Actor_Signature":
    "MIIB6qYJKoZIhvcNAQcCoIIB2zCCAdcCAQExCzAJBgUrDgMCGgUAMAsGCSqGSIb3DQ
    EHATGCAbYwggGyAgEBMIGcMIGOMQswCQYDVQQGEwJVUzEOMAwGA1UECBMFVGV4YXMxF
    DASBgNVBAcTC1NhbiBBbnRvbmlvMQ0wCwYDVQQKEwRVVFNBMQswCQYDVQQLEwJDU1EX
    MBUGA1UEAxMOYWkuY3MudXRzYS51ZHUxJDAiBgkqhkiG9w0BCQEWFWp1bG1EBhaS5j
    cy51dHNhLmVkdQIJAMvyApGmAWbKMAkGBSsOAwIaBQCggbEwGAYJKoZIhvcNAQkDMQs
    GCSqGSIb3DQEHATAcBgkqhkiG9w0BCQUxDxcNMDcwMjEyMjI1ODU4WjAjBgkqhkiG9w
    0BCQQxFgQUdBfDeKmnhmYA9D1LxfqzK1vwEwUgYJKoZIhvcNAQkPMUUwQzAREggqhki
    G9w0DBzAOBggqhkiG9w0DAgICAIAwDQYIKoZIhvcNAwICAUAwBwYFKw4DAgcwDQYIKo
    ZIhvcNAwICASgwDQYJKoZIhvcNAQEBBQAEgFbd+8cZ1vvgvrjj811QbR2o7gWdWBM9y
    av6NJR2eBVj3hRGaKQ+7JNbygcqtVcMD1oljSpsZas33BvhocwGOqs=",
"Actor_Type": "Lender",
"Ledger_Record": "Lien_Ledger",
"Ledger_Record_Version": "1.0.0",
"Ledger_Record_Time_Date": "2019-02-18T04:23:51Z"
}

"Data": {
  "Record_Key": "UUID_Value",
  "Value": {
    "Action": "Lend",
    "Asset Info": {
       "Asset_ID": "JH4TB2H26CC000000",
       "Asset_Type": "Car",
       "Asset_Mfg_Date": "2019-01-15",
       "Asset_Mfg_Origin": "Canada",
       "Asset_Digital_Signature":
    }
    "Member_Data":{
       "Digital Lien Data": {
          "lender_data": {
             "uid": "[lender1_uuid]",
             "amount": "$12,302.32",
             "loan_date": "2019-02-20",
             "term": 60,
             "loan_rule": {
                "delinquent_rule" : "120d",
                "delinquent_action" : "auto_repo"
             }
          }
       },
       "Consortium_Data": {
          "lien_data": {
             "status": 1,
             "last_mod_date": "2019-02-06",
             "lien_holder": "[lender1_uuid]",
          }
       }
    }
}
"Footer": {
       "Peer_ID" : "d611ada-2195-4d3c-a8e2-64445aaac732",
       "Region_ID" :"c353732d-5f65-4668-ac64-7480084a1e2f",
       "Attester_ID" : "99c7ae8b-d9e4-457a-9e48-b5c69e22e30a"
}
```

FIG. 17

DIGITAL ASSET MANAGEMENT

CROSS REFERENCE TO RELATED APPLICATIONS

This application is a continuation of U.S. patent application Ser. No. 18/823,271, filed Sep. 3, 2024, which is a continuation of U.S. patent application Ser. No. 18/425,555, filed Jan. 29, 2024, which issued on Sep. 3, 2024 as U.S. Pat. No. 12,079,824, which is a continuation of U.S. patent application Ser. No. 17/542,204, filed Dec. 3, 2021, which issued on Feb. 20, 2024 as U.S. Pat. No. 11,909,881, which is a continuation of U.S. patent application Ser. No. 16/689,741, filed Nov. 20, 2019, which issued on Jan. 11, 2022 as U.S. Pat. No. 11,223,474, which claims the benefit of U.S. Provisional Patent Application No. 62/769,971, filed Nov. 20, 2018, which are incorporated by reference as if fully set forth.

TECHNICAL FIELD

This disclosure relates to processing legal titles, and specifically to registering digital legal titles with an issuance authority.

BACKGROUND OF THE INVENTION

A legal title is evidence that establishes a right to possession and control of an asset. It serves as proof of who owns the asset and who is legally entitled to possess and control it. The asset may be bought, sold, or processed for many reasons including a name change. Name changes sometimes occur after marriages and divorces.

A vehicle is a typical asset transferred by a title. Vehicle titles prove who owns the vehicle. When a vehicle is sold, a title is legally transferred to the new owner when the title is registered. Registration requires a number of processes that include releasing ownership of the vehicle, assigning ownership to the new owner, and registering the sale with an issuance authority (e.g., a title issuance authority, a local, a state, and/or federal issuance authority, a private authority, vehicle titling administrators, department of motor vehicle agencies, field registration offices, etc.).

If a bank or a lienholder is on a vehicle title, the lien must usually be removed before the vehicle is transferred. Typically, removing a lien complicates a transaction as lienholders usually provides very specific directions on to how remove or transfer the lien. Issuance authorities can also over-complicate the registration process as some require the completion of certain forms, signatures on certain lines, and the submission of additional information. When buying a new car, dealers usually navigate these complexities by following the many state rules that spell out the processes that must be followed.

In addition to the complexity of completing a registration of a vehicle, which is often delayed by errors or by not complying with state rules, privacy protection is also a concern during the registration process. The disclosure of personal information that is part of the registration process is prohibited in many jurisdictions when there is not an express consent. Noncompliance can result in fines and civil actions and the misuse of confidential information.

BRIEF DESCRIPTION OF THE DRAWINGS

The disclosure is better understood with reference to the following drawings and description. The elements in the figures are not necessarily to scale, emphasis instead being placed upon illustrating the principles of the disclosure. Moreover, in the figures, like-referenced numerals designate corresponding parts throughout the different views.

FIG. 11 illustrates pseudocode that generates tokens, validates tokens, and transmits tokens across trust boundaries.

FIG. 17 is a lien ledger record.

DETAILED DESCRIPTION OF THE PREFERRED EMBODIMENTS

Figure 1:
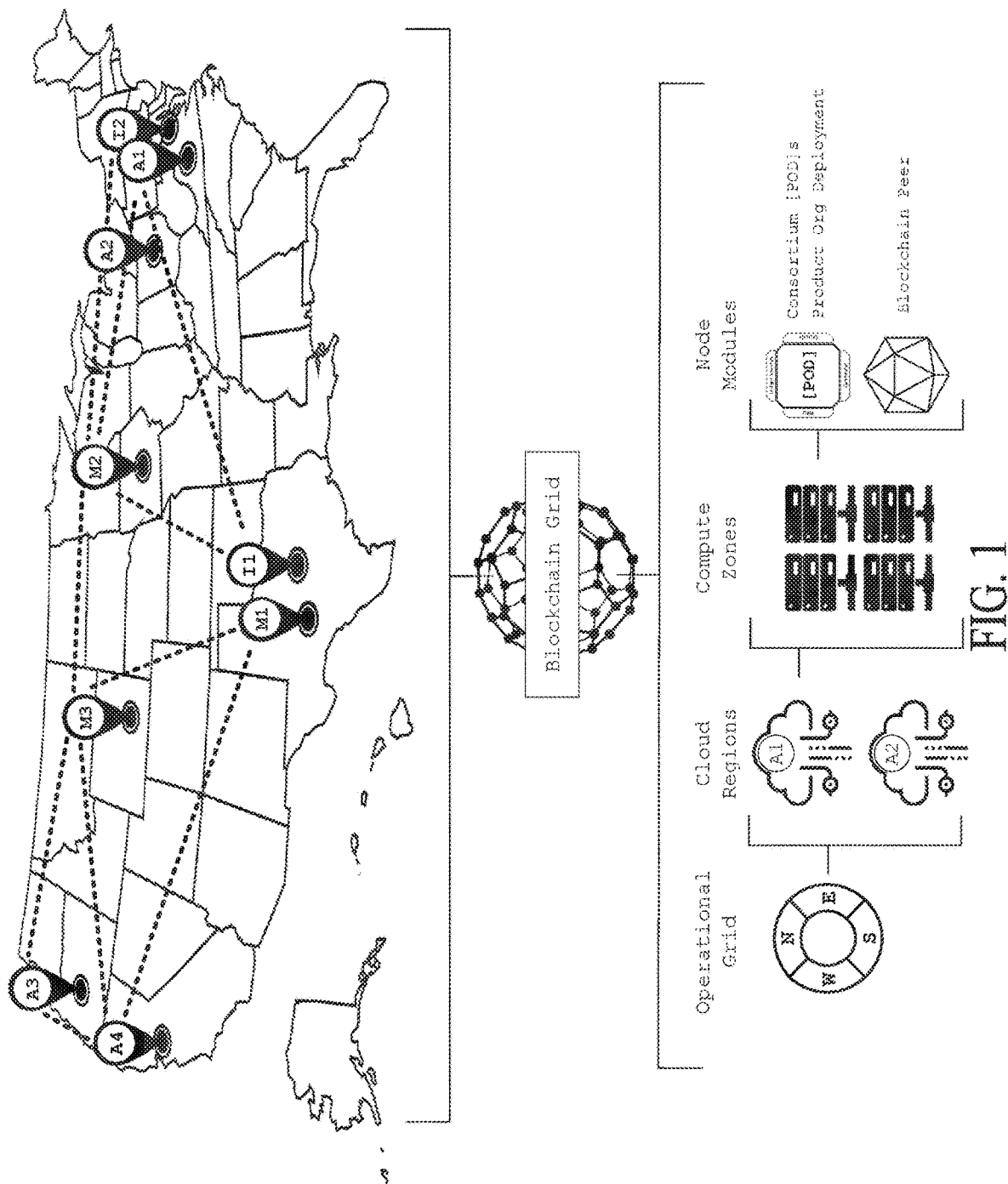
FIG. 1 is a high-level view of a digital title asset management operational grid and operational building blocks.

The disclosed digital title asset management systems and methods (referred to DTAM systems, vehicle transfer systems, or systems, herein) efficiently process certificates or titles that establish a person or entity (e.g., a business or corporation, for example) as the legal owner of an asset. A title is a bundle of rights in an asset in which a party owns a legal or equitable interest. The bundle of rights may be individually or jointly shared and is set forth in a writing usually in a physical document. For example, a vehicle title is a document that confirms interests and rights in a vehicle. A title provides public notice of ownership.

Using technology that forms a basis for the digital title ecosystem, the disclosed systems provide in-state and out-of-state title processing that facilitate direct electronic registration and a fast release of titles by connecting issuance authorities to remote sites and secure automated workflows. The systems connect issuance authorities and financial service providers to small and large retail operations that include first-line business partners and service providers and second-line business partners.

First-line business partners are partners who receive information directly from government jurisdictions and use it to complete asset registration and titling activities for that partner's own business. First-line service providers are partners who receive information directly from government jurisdictions and transmit it to other authorized business partners for asset registration processing. Second-line business partners are partners that receive information from the first-line service providers. Second-line business partners include a registration service, a vehicle dealer, a dealer network, a dealer association, a dealer consortium, a leasing company, a salvage pool, a dismantler, a rental car company, etc., for example.

Using the disclosed systems, users can transfer titles over a network (also referred to as a grid or an electronic network) and do just about anything that can be done when manually processing physical titles, including the recording of bought and sold vehicles, recording names changes, or using vehicles, for example, as collateral when extending credit albeit through innovative and secure turn-key systems that use cryptographic protocols. The underlying assets can be bought, sold, exchanged for other assets or processed for any purpose. Because the technology processes titles that are entirely virtual, the technology is broadly extensible and is fast, secure, and borderless.

The disclosed system is a permissioned distributed peer-to-peer (P2P) system. The peer-to-peer system works by decentralizing a deterministic consensus function. While in some systems there is an administrative point of control, in alternate systems, the point of control is distributed, in which users can prove ownership of the underlying asset through the digital title asset management network (also referred to as a grid or a network) through consortium peer endorsement as well as certified attestor peers and/or on-line peer nodes and/or nodes. While the digital title asset management system uses encryption keys to prove ownership, some keys are generated remotely from the users' interfaces and are subject to secure and confidential key-exchange protocols that allow for the transfer of encryption keys or an association to encryption keys (e.g., such as universally unique identifiers) from one conversant module to another, while not storing the encryption keys on a user's systems or allowing direct access to them. This secure and confidential protocol makes it far less likely that some encryption keys are exposed to the public and far less likely that an encryption key will be compromised.

FIG. 1 is a high-level view of the system's operational grid. The operational grid comprises interconnected geographically distributed computing zones, that in some systems, are distributed and hosted by computing cloud regions. Cloud computing zones or cloud services comprise a plurality of physical computing machines and nodes that serve the product organization deployment modules (POD). The cloud computing zones and cloud services provide on-demand computing resources, especially data storage and processing, through server clusters and other devices.

Figure 2:
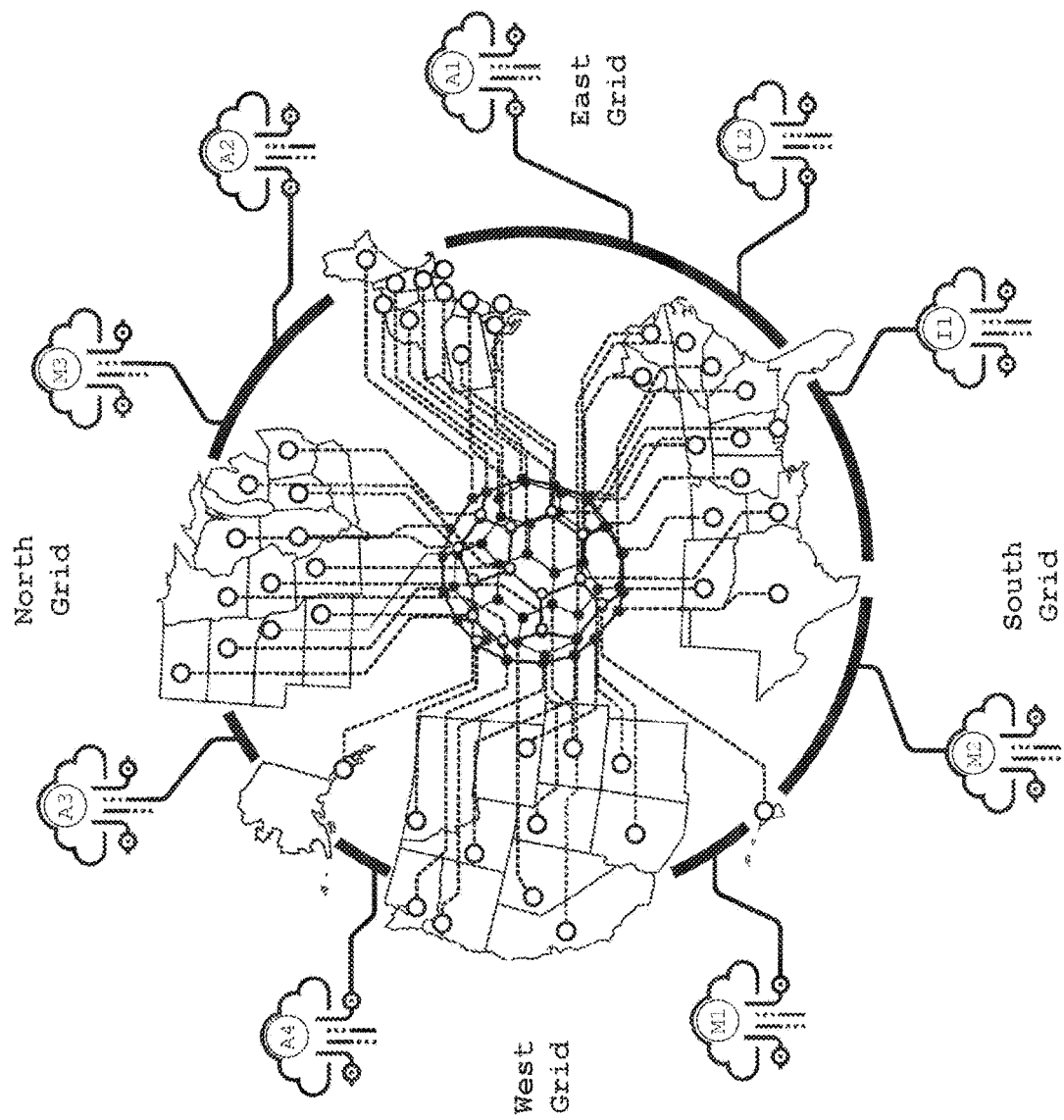
FIG. 2 represents a second view of the digital title asset management distributed operational grid.

FIG. 2 shows the systems operational grid distributed among regions that include states (e.g., autonomous territorial and political units) and issuance authorities through the cloud computing zones. Groups of independent servers operate among the four grid regions, although they appear to clients as if they were a single server. The operational grid improves network capacity by, among other things, enabling applications, servers and clusters to shift work to balance loads in cloud computing zones and across cloud computing zones. By enabling an application to take over for another application in a server, and/or a server to take over for another server in a cluster and/or for one computing zone to take over for another computing zone in the system, the system architecture and clustering enhances network stability and eliminates downtime caused by application, server, cluster, and zone failure. Here, redundancy and operating policies are important at the application level, the server level, the cluster level, and/or the zones some and all of which enables the systems to continue operating in the presence of faults, which improves the system's dependability, availability, reliability and fault tolerance.

The systems organize fault detections into structured patterns that causes the systems to drain traffic from a compromised device, shut down unstable code, malfunctioning portions of hardware, or corrupt or failing host software on one or more devices (e.g., a server or cluster for example) completely, or shift work to other applications, servers, clusters, and/or computing zones when failures occur or are predicted (e.g., via monitoring and comparisons to failure or pre-failure condition states stored in a memory). The fault remediation processes can drain traffic from the servers, stop servers and/or clusters from taking new sessions, let existing communication and/or sessions expire, or initiate a system or software reset, and restart the session without losing any session data. Dynamic or static operating policies may be enforced based on monitoring device behavior (automatically) and/or in response to a manual or automated command. A session occurs during which an application is running. It is the time during which an application program accepts input and processes information. It is analogous to an individual conversation.

Figure 3:
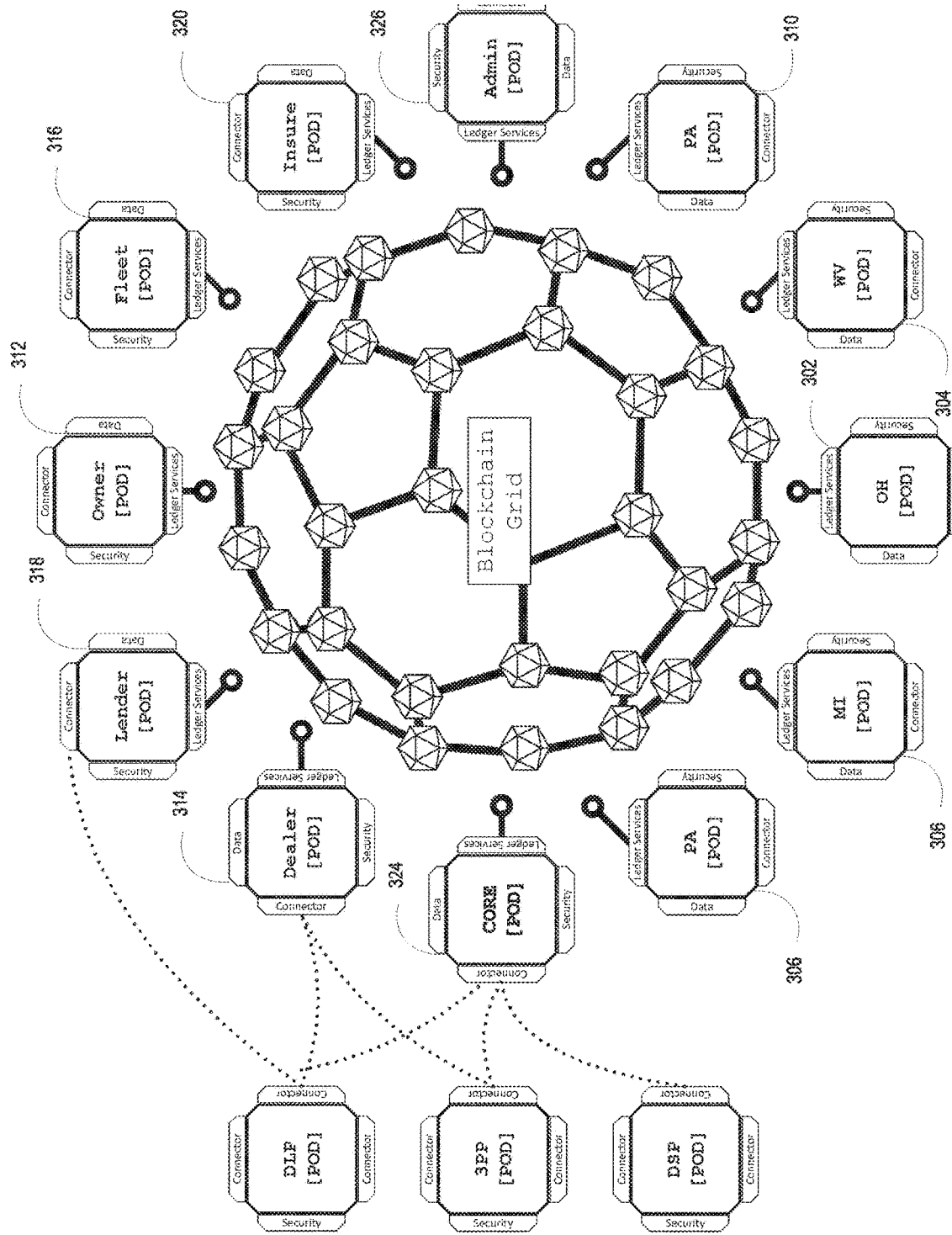
FIG. 3 shows product organization deployment modules in the digital title asset management system interfacing peers.

FIG. 3 shows how product organization deployment modules interact with their peers in a computing environment. The product organization deployment modules support multiple cooperating but different processes in such a way that the product organization deployment modules work together to deliver consistent, connective, and extensible services. They include state modules, such as the exemplary Ohio, West Virginia, and Michigan product organization deployment modules 302-306, respectively, and the title issuance authority product organization deployment modules 308 and 310 that represent government jurisdictions and first-line business partners. State modules refers to the software routines and data structures associated with one or more internally autonomous territorial and political units. In some instances, the internally autonomous territorial and political units compose a federation under a sovereign government or union. First-line issuance authority members, e.g., state DMV agencies, may serve as certified attestors and their peers are referred to as certified attestor peers. The first-line business partners are shown as the owner product organization deployment module 312, which may be a national rental car company, for example. The distributed network also includes second-line business providers that include dealer, fleet owner, lender, and insurer product organization deployment modules 314-320, respectively, that communicate with the first-line business partners that are coordinated by the core and admin modules 324 and 326. The second line business providers are referred to as the consortium and their blockchain peers as consortium peers.

Figure 4:
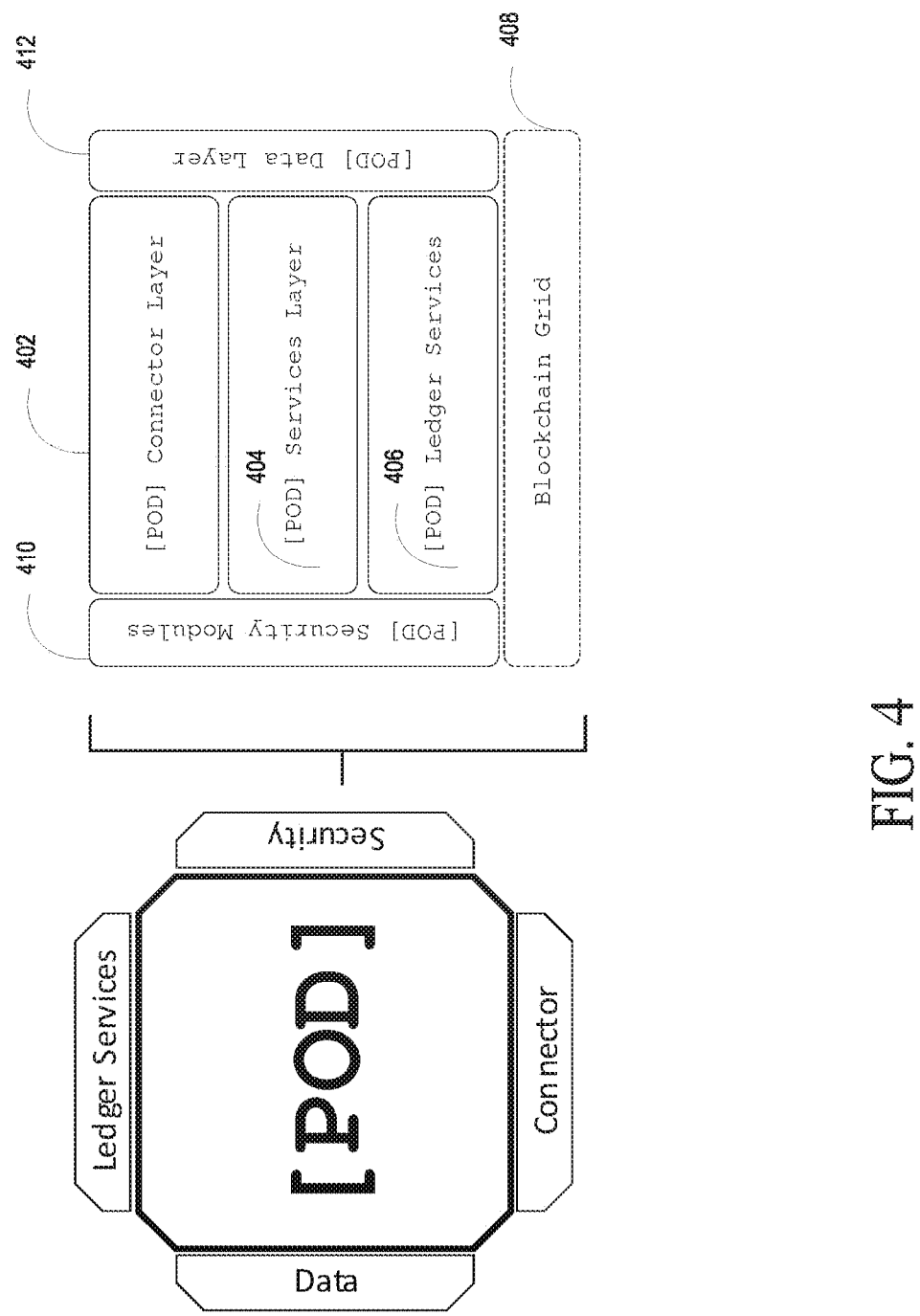
FIG. 4 is a logical representation of the product organization deployment modules.

FIG. 4 is a logical representation of product organization deployment modules. The product organization deployment modules encapsulate a product organization deployment module connector layer 402, a product organization deployment module services layer 404, a product organization deployment module ledge services layer 406, a blockchain grid interface 408, product organization deployment module security modules 410, and a product organization deployment module data layer 412. The connector layer 402 establishes how external devices interface with product organization deployment modules, whether it be through a web interface, an application program interface (API), and/or some other internal or external interface. The services layer 404 retains the business logic of the respective product organization deployment modules. The ledger services layer 406 is a proxy that interacts with the blockchain grid 408. The data structure used in the blockchain network is an ordered back-linked list of blocks of transactions. Each block refers back to the previous block in the chain and layered on top of each other, with the first block serving as the genesis block. Off to each sides of the product organization deployment modules are the security modules 410 and a data layer 412 that are used to monitor transactions as well as maintain system state. The data layer 412 processes and monitor the details of the state of an activity in which it participates to compensate for the inherent latency that is part of blockchain network systems.

In FIG. 4, each product organization deployment module is deployed with a predefined policy followed by its smart contract. Proof of attestation policies define which consortium and certified attestor peers need to agree to a transaction, and in some alternate systems, in the time periods that it must be achieved before a transaction can be added to the blockchain network and the local ledgers maintained by the product organization deployment modules. Some product organization deployment modules' local ledger services 406 may service a lightweight node too associated with a full blockchain or full node. The proof of attestation policies in some system may vary with each domain and with each transaction. For example, a registration of a merchant selling a large-value item or an item that belongs to a certain class or domain of items may require more attesting peers, and in some use cases, in less time than a merchant selling a smaller-value item or those belonging to a different class or domain. The more proof of attestation attestors elapse, the harder it becomes to invalidate the transaction. The permissioned blockchain includes the domain-specific knowledge associated with the specific domains that specify the number of required attesting peers required to endorse a transaction, and in some use cases, the timing in which it must occur. The required number of attestors is specified in the proof of attestation policies that is part of the smart contract. In this disclosure, a full node maintains a complete and an up-to-date copy of the blockchain. Lightweight nodes maintain a subset of the full blockchain. Both lightweight and full nodes verify transactions through attesting peers or nodes. The term smart contract also encompasses the software that implements the interfaces that initialize and manage the local ledger state, which includes tracking attestation transactions that are submitted by other product organization deployment modules and authorized nodes. A node or peer is a device that is connected to the grid that is capable of communicating with other grid devices and product organization deployment modules. All nodes and peers include a routing function that allows it to participate in the grid and some include other functionality. In the blockchain network, all nodes validate and propagate transactions and blocks, and discover and maintain connections to peers.

Figure 5:
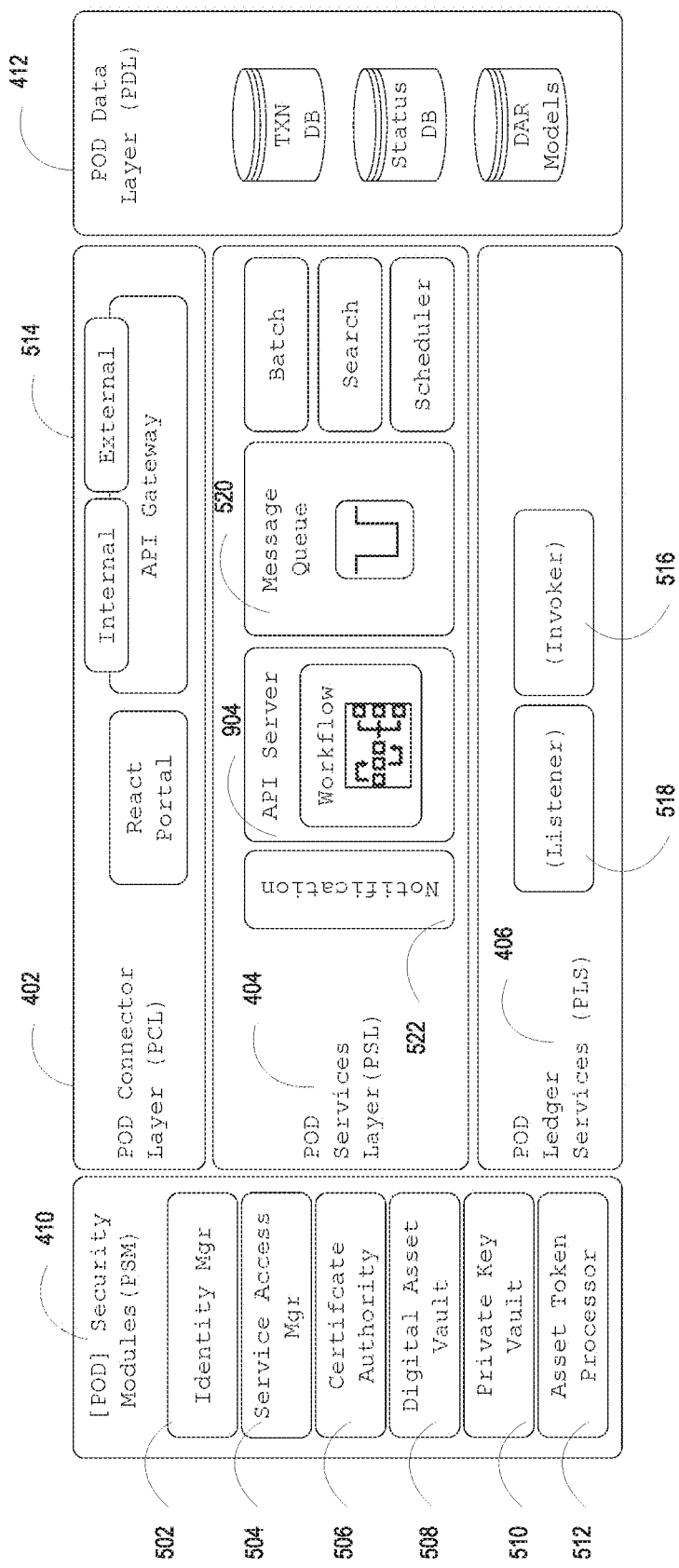
FIG. 5 is a second level representation of the product organization deployment modules.

FIG. 5 is a second level representation of the product organization deployment modules. The security modules 410 provide the sets of components that perform the cryptographic operations on behalf of the product organization deployment modules. These operations include an identity manager 502 that executes authentication and authorization. The service access manager 504 authenticates the service layers 404. It prevents intermediaries from listening to messages between recipients, intercepting the messages, and modifying and generating new messages to impersonate the parties that is usually done without any noticeable delays. In effect, it prevents a party from sitting between them and reading all of their secret communications.

Each of the product organization deployment modules have their own certificate authority (CA) 506 where actual certifications are generated and used to sign the public key and source information (e.g., information about the product organization deployment module source) as part of the public-key protocols used to communicate in the grid. In some systems, there are two separate CAs, one for private-public key, and the other for Transport Layer Security (TLS) encryption. The product organization deployment modules include a digital asset vault 508 that stores all types of the nonreducible textual elements, unique structured data objects, and/or types of tokens that serve as a proof of claim, that in some use cases, also authenticates a user. The private key vault 510 stores the private, secret, or decryption keys used in the asymmetric algorithms executed in the grid, such as public-key algorithms. The private key is unique to a user member.

In FIG. 5, the private keys are protected through layers. So, when a user requests an action be taken by a product organization deployment module, it passes an authorization token via an application programming interface (API) 514 and the services layer 404. Once validated, the ledger services layer 404 retrieves the private key associated with that member's group that can be used to interact with the blockchain network. So once validated, transactions can occur without the user knowing how to retrieve a private key and use it to confirm their transaction. This drastically reduces the risk of compromising private keys.

In FIG. 5, the proof of claim provides security and resilience for the grid. An asset token processor or token processor 512 validates incoming token types received through the application programming interface gateway 514. An invoker 516 invokes the smart contract that instantiates smart contracts that commit transactions (e.g., commit action) to the blockchain network and an event listener 518 monitors blockchain events. A smart contract is a self-executing transaction with the terms of the transaction between parties directly written into the lines of software code. The software code and the transactions contained therein exist across the distributed, decentralized permissioned blockchain network. For example, when a transaction is fully committed to the permissioned blockchain network via a smart contract, such as when a vehicle title issues because of a sale, the issuance of its title by an issuance authority extends the blockchain. Event listeners 518 detect such extensions and other actions or occurrences on the blockchain network, and generate messages that are placed in the message queue 520 thorough the services layer 404. The services layer 404 transmits notifications 522 to other devices including dealer product organization deployment modules 314, notifying them when a title application on a vehicle identification number issued allowing the dealer product organization deployment modules 314 to notify its end-users. The notifications are transmitted via messaging to local or remote sites (e.g., sites associated with a dealership), in batch, on a schedule, or in real time. Real time operations are those in which the machine's activities (e.g., the applications that are accessible via user-friendly and intuitive interfaces) exceed the user's perception of time and those in which the computer processes input data within milliseconds (preferably less than about 100 milliseconds) or at a faster rate so that its output is available virtually immediately.

Figure 6:
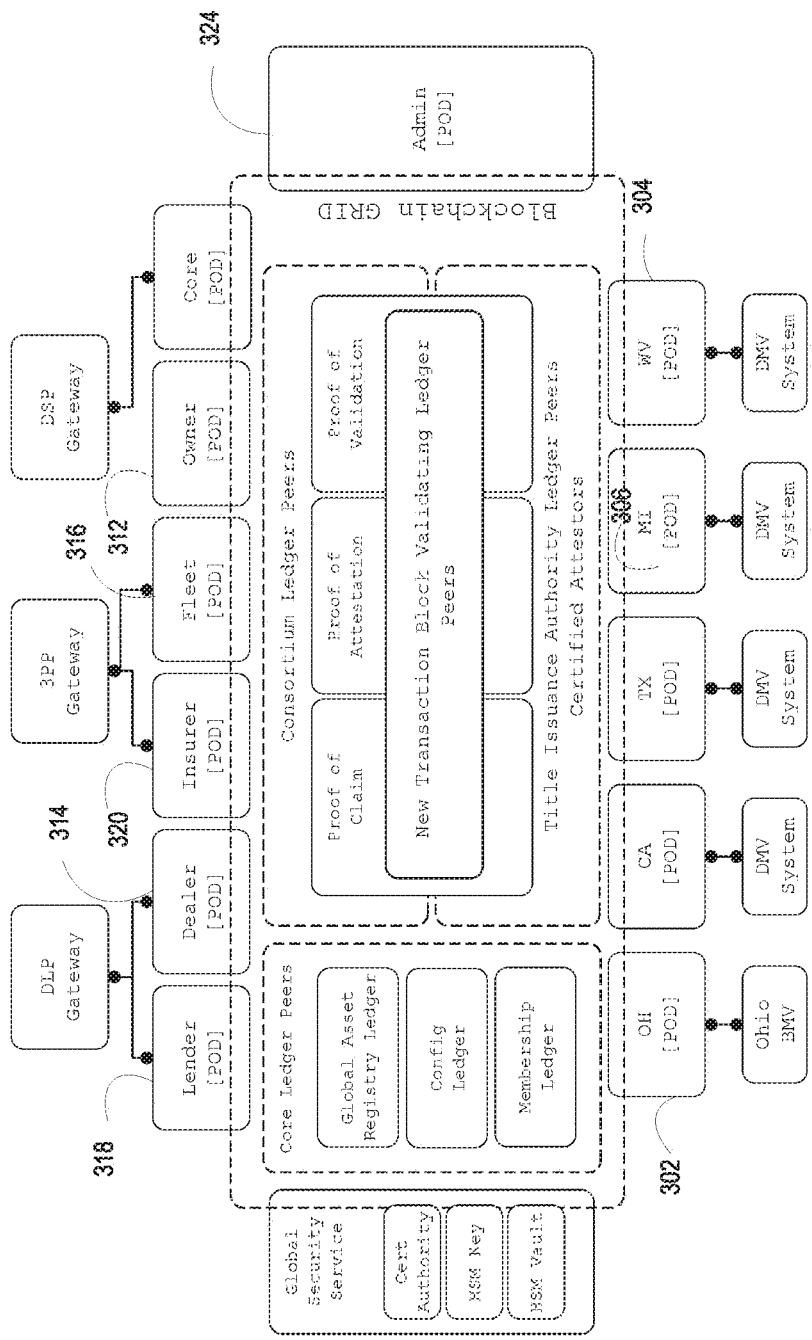
FIG. 6 shows exemplary product organization deployment modules.

FIG. 6 represents exemplary product organization deployment modules that may be used in the system. The system is flexible and extensible, thus if a car sharing company or consortium desired to join the network as a second-line business partner to record fractional ownership shares in a vehicle, a new product organization deployment module can be deployed as an extension of the network with no noticeable changes to the systems or other product organization deployment modules. The system can be implemented in all fifty states and the District of Columbia (D.C.), for example, and each can enforce common or different terms including different proofs of claim and consensus (e.g., proof of attestation).

Besides the use of cryptographic protocols that are used to ascertain the origin of a message (e.g., the person is who s/he says s/her is), verify the message's integrity (e.g., their credentials are valid), and prevent repudiation (e.g., that the supporting documents purporting to come from a person came from them), the system's architecture ensures privacy and protection. Consider the access given to the ledgers shown via the document icons in FIG. 6, such as for example, the ledgers coupled to the dealer product organization deployment module 314. In FIG. 6, the dealer product organization deployment module 314 can post transactions to a configuration ledger, an ownership ledger, and a vehicle transfer ledger (not shown). The system does not allow the dealer product organization deployment modules 314 to directly add transactions to a state title blockchain networks (e.g., that support private transactions and confidential contracts), such as the Ohio, the Michigan, and the West Virginia blockchain networks, respectively, for example, to ensure that the respective blockchains are not changed outside of the state's data centers, for example.

To expose the respective state title blockchain networks and/or other private blockchain networks outside of data centers, some systems replicate the private blockchain networks, and expose only read-only forms to other product organization deployment modules outside of the data centers. The read-only blockchain networks include no smart contracts and cannot be extended. Instead, proposed transactions are routed through an intermediary, here, the ledgers associated with core or admin modules 324 and 326, which are submitted to the appropriate private blockchain networks. In the use case of FIG. 6, an Ohio title transfer is submitted to the core and admin modules 324 and 326 before the transaction is submitted to Ohio's permissioned blockchain that serves Ohio blockchain network. The core and admin modules 324 and 326 maintain and enforce all of the rules that the peer and consortium modules observe. They determine what peers are allowed to participate, the respective permissions, etc. that is updated by a governance process.

The disclosed systems are flexible and allow users to access data in many different ways. For example, the product organization deployment modules supporting an insurance consortium 320 may opt to expose a minimal amount of data to establish a proof of insurance. Sharing small amounts of data may ensure compliance with state rules and minimize the massive storage requirements that are often needed to store supporting documents. In an exemplary use case, a peer of the consortium (the peers are shown the hexagons and consortiums are shown as the product organization deployment modules), may store a one-way hash function in an internal ledger that is synchronized to a blockchain network asynchronously. In this use case, an insurer need not store copies of the documents in the blockchain network nor store the one-way hash function locally (e.g., as it can be calculated on demand), which mediates the large storage requirements needed in most systems and minimizes security concerns.

Figure 18:
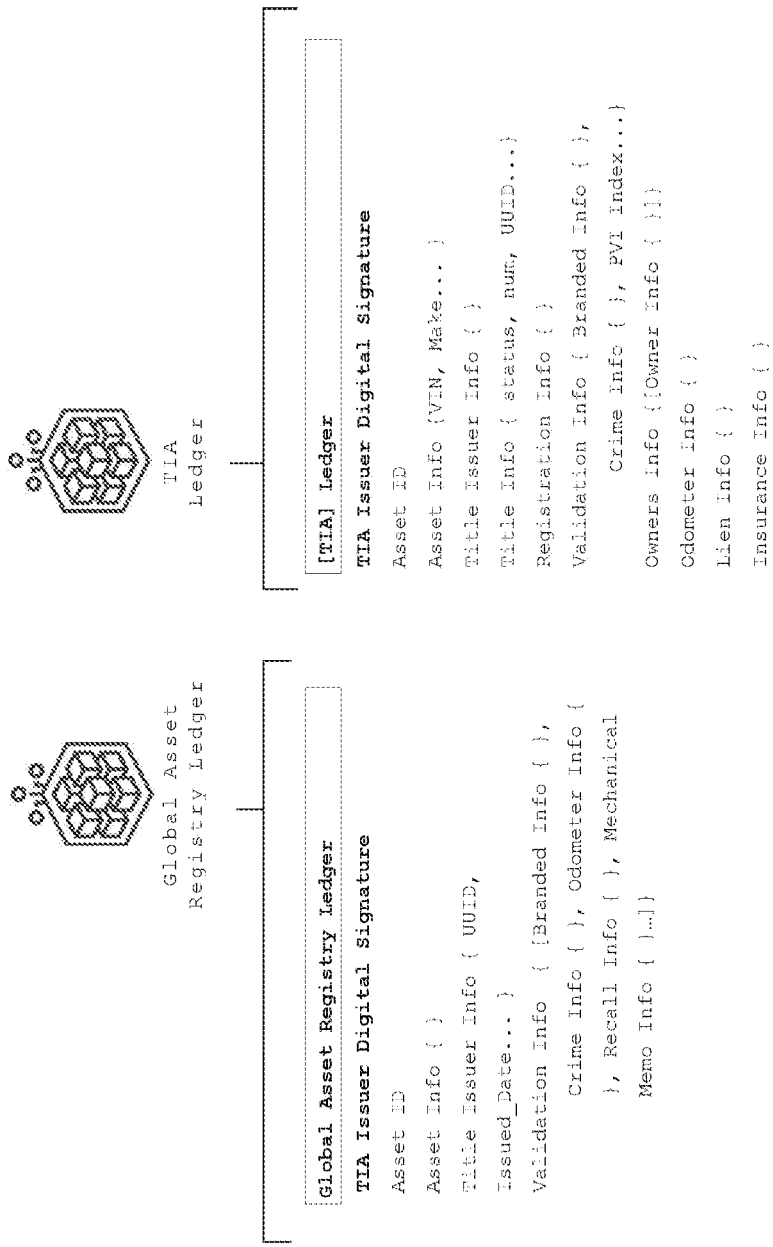
FIG. 18 is an exemplary global asset registry ledger.

Many of the product organization deployment modules have access to a global registry (shown in FIG. 18). In a vehicle context, the global registry is a single authoritative source of normalized information and vehicle titles. Because issuance authorities interpret and issue titles differently, classify vehicles differently (e.g., as to what constitutes a totaled vehicle), and because titles may be washed, the global registry is designed to give all of the product organization deployment modules and issuance authority access to the most complete information associated with a vehicle. It is designed to protect users from fraud, unsafe vehicles, and to keep stolen vehicles from being resold.

Figure 7:
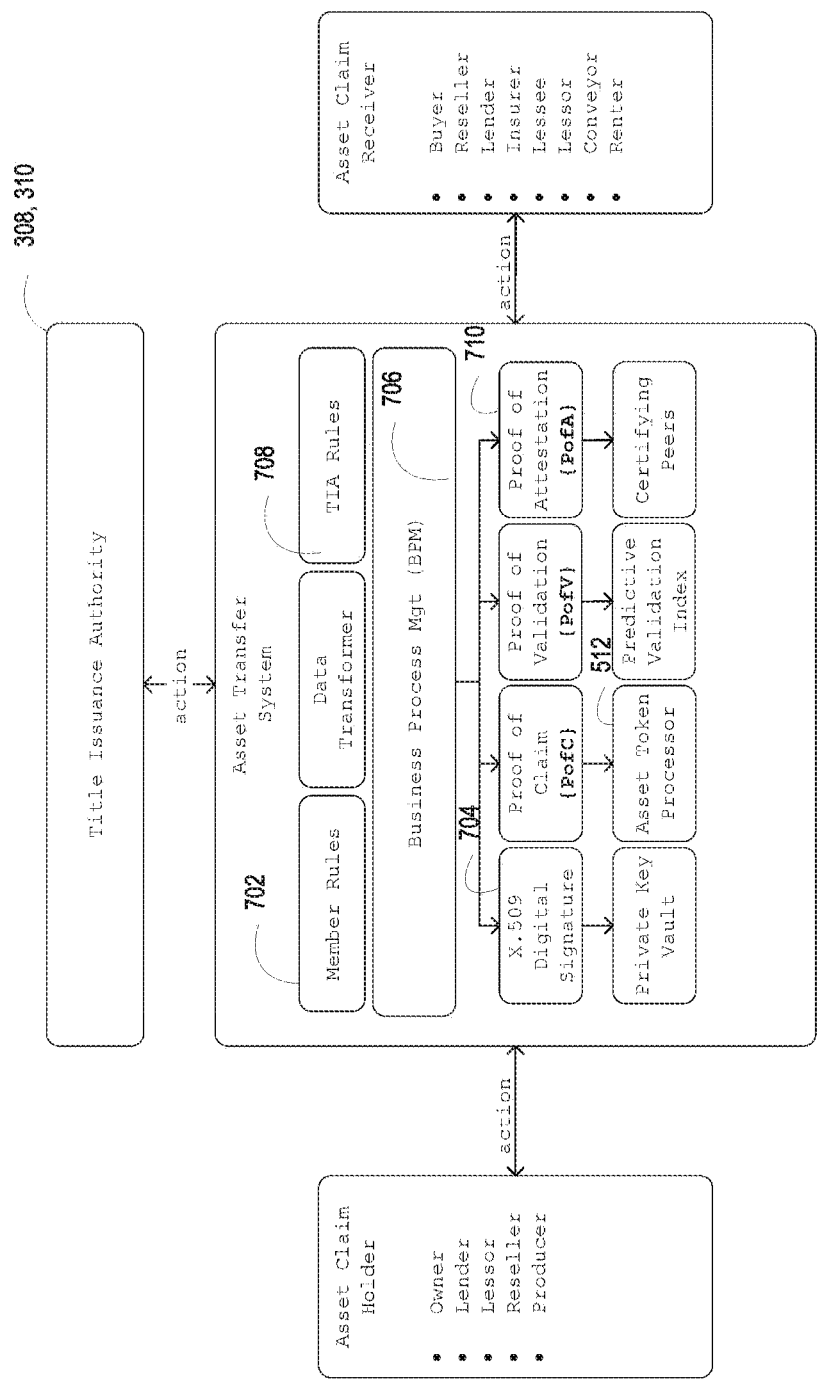
FIG. 7 shows the functionality associated with the actors and actions in an exemplary system.

FIG. 7 shows the functionality associated with the actors and actions in an exemplary vehicle transfer system. In FIG. 7, the asset claim holders encapsulate a claim to the asset. These users include owners, lenders, lessors, resellers (e.g., dealerships), manufacturers, salvage processors, third party processors, and producers (e.g., an entity that builds niche vehicles, for example). The asset claim receivers, take the asset subject to the claims to the asset. They include the buyer, reseller, lender, insurer, leases, conveyors and renters.

Because not all actions require title issuance authority (e.g., usually reserved for the issuance authority product organization deployment modules), title transfer may be made by member rules 702 too. In FIG. 7, the asset transfer system is compliant with the core and admin functions of the network. For example, when a dealership wishes to reassign a vehicle to another dealership (another reseller) to enable a sale at another dealership, the first dealership may assign the manufactures' certificate of origin (MCO) to the second dealership without registering the vehicle's title with an issuance authority. When the vehicle first enters the system in an exemplary use case, the asset transfer system generates a unique digital signature 704 based on the manufacturer's certificate of origin and vehicle identification number that associates the user's public key with that vehicle. At the direction of the business process logic 706, the signature (X.509 certificate) may be signed by the private key that is stored in the private key vault 510. With the certificate generated, the dealership holding that certificate can rely on the public key it contains to establish secure communications with the other dealer, or validate documents digitally signed by the corresponding private key.

As further shown in FIG. 7, users are subject to domain specific member rules 702 too. For example, insurers are subject to different rules than lenders, whose rules may focus on adding or removing liens. Similarly, each issuance authority may have different title issuance rules 708, such as for example how fees are tendered and how data is translated into specific fields for their respective systems. The business process management rules are digitally signed and determine what hardware/software (e.g., non-authorized systems) can deploy on the system. Further, updates to the business process management engine 706 or new functionality to be added is authenticated and verified. For example, in some systems, the business process management engine's rules must be digitally signed (preferably with a time stamp) by an approved source before it can be deployed. In FIG. 7, each product organization deployment module has its own private key just like individual users affiliated with them.

In FIG. 7, the attestation rules determine the validity of the transactions and blocks that extend the blockchain network. The permissioned blockchain defines the policies around the execution of its smart contract. The proof of attestation policies stored therein define which peers are required to attest to the transaction before it can be added to the intended blockchain network and the local ledger maintained by the product organization deployment modules.

Figure 8:
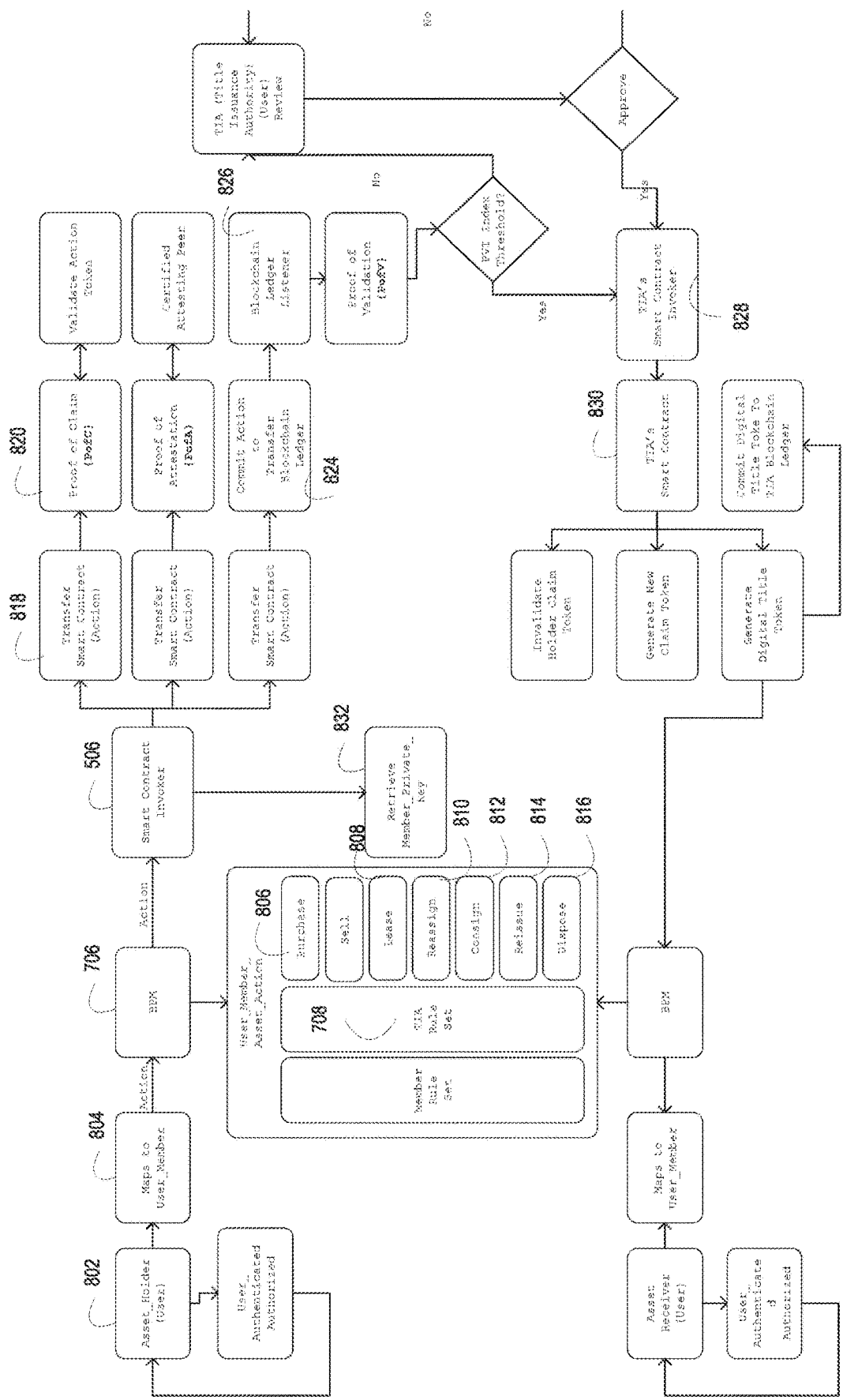
FIG. 8 is a high-level data flow of an asset holder that is subject to an authentication and an authorization.

FIG. 8 illustrates a high-level data flow of an asset holder that is subject to an authentication and an authorization. The flow incorporates layers of protection that authenticates the users and verifies the integrity of their transactions. As shown, when a user is authenticated at 802 the user's credentials are associated to one or more user members that they belong to at 804. The association may be a one-to-one member association or a one-to-many member association. With the user authenticated and mapped to its members, the business process management engine 706 loads the issuance authority rules shown as title issuance authority (TIA) rules 708 and the transaction rules associated with the desired action the asset holder requests. In FIG. 8, rules relating to a purchase 806, lease 808, reassignment 810, consignment 812, reissue 814, and/or a disposal of a vehicle 816 is loaded by the business process management engine 706. A smart contract invoker 506 retrieves the member private key 832 associated with the transaction, and uses the member private key to commit one or more transactions to smart contracts.

In this disclosure, the smart contracts are atomic in nature. If the smart contract involves a security interest, for example, the requests such as adding a lien, transferring alien, releasing a lien, etc., for a lender are executed through separate smart contracts that are signed by the lending members' private key. In some systems, the transactions are not aggregated into a single smart contract because one or more of the transactions may be subject to different proof of attestation policies. The static or dynamic proof of attestation policies established in the system may vary with the level of financial risk or other risk associated with the transaction and/or with the level of sensitivity associated with it.

Once formed, the admin module 326 deploys the smart contract(s) by digitally signing them with the admin module's private key (that is separate and different from the member private key and the user's private key) and a token processor validates that the asset holder has a claim against the asset (e.g., a physical and/or virtual asset) at 818 and 820. The smart contract invoker 516 executes a service discovery to find out which peer are available to attest to the transaction at 822. The smart contract invoker 516 also fetches the relevant proof of attestation policies from a database and invokes the smart contract that commits the transaction to the blockchain network at 824. A title issuance authority listener detects such commitment events at 826, which invokes the permissioned smart contract at 828 that instantiates smart contracts to the title issuance authority blockchain network 830. The title issuance authority smart contract leverages a proof of validation to determine the confidence level, provided in a pvi (predictive validation index) value, of the submitted transaction is valid. The pvi value range on a scale such as from about 1 to about 100, for example, with the higher limit, 100 in this example, indicating a high confidence the transaction data is valid and conversely a lower pvi value indicating a possible deception or mistake such as a potential fraud, an error, and or discrepancy in the transaction data. Each title issuance authority may configure the pvi value range that may include vehicle approvals and/or rejections and/or flags those transactions requiring additional or a manual review.

Figure 9:
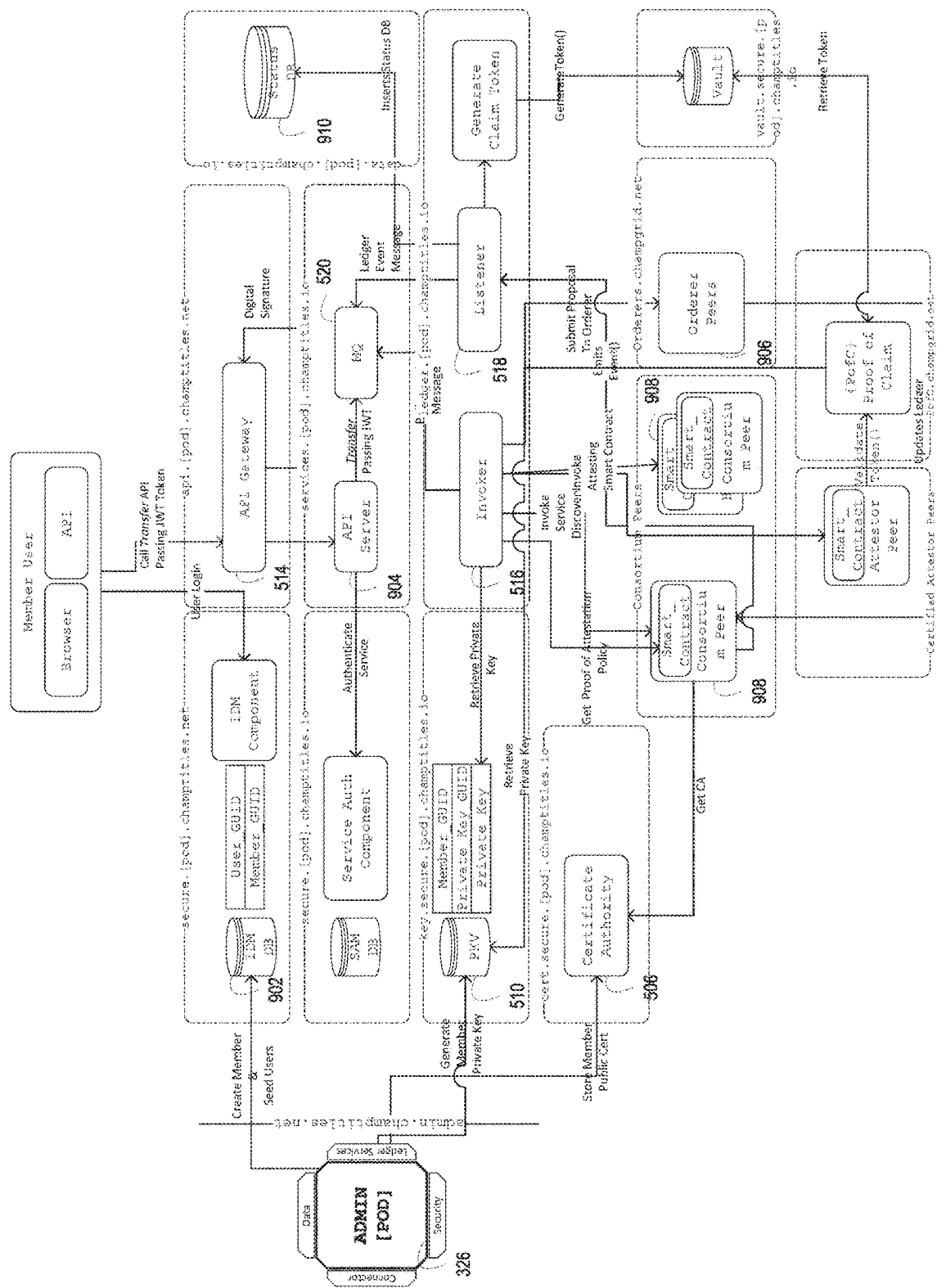
FIG. 9 is a detailed flow of user and member registration related submission.

FIG. 9 is a detailed flow of a registration related submission for an asset. The process begins when the user logs in to the system and the system confirms the user's credentials. Once logged in, the system associates the user with a member and generates and stores a unique private key with a public certificate generated by the systems certificate authority 506 and stores the unique private key with a public certificate in the private key vault 510. A universally unique identifier in the form of a token identifies the user across all modules of the system. It is generated by a random seed generator resident to the admin module and stored in an identity manager database 902.

With the token authenticated, the application programming interface gateway 514 converts information into a form compatible with the receiving system protocol before transferring it to the application programming interface server 904. The application programming server 904 authenticates itself against the services layer 404 and sends the authenticated token and transaction request (e.g., shown as a title transfer request) to the message queue 520. The message queue 520 prevents the application programming interface server 904 from directly invoking the ledger services layer 404 and specifically the invoker 516. The invoker 516 pulls the transaction request from the message queue 510 and retrieves the member's private key from the private key vault 510. The invoker 516 uses the private key to commit the transactions to one or more smart contracts. Once formed, the invoker 516 executes a service discovery to identify which certified attestor peers are online and capable of attesting to the transaction. The invoker 516 also fetches the proof of attestation policies and invokes the smart contract that commits the transaction to the blockchain network when a consensus is reached. When a consensus is reached, the invoker 516 submits the transaction to the order peers 906 that invokes the smart contract that commits the transaction to the blockchain network thorough the permissioned blockchain peers 908. The permissioned blockchain peers 908 emit an event notification to the listener module 518 that writes a message to the message queue 520 that the transaction was approved and the requested transaction was executed. The listener modules 518 inserts a status indicator into a status database 910 and transmits a notification to the user (e.g., the dealership). The status database 910 duplicates the transactions status providing the user with quicker access to confirmed transactions in comparisons to queries of the blockchain networks.

Figure 10:
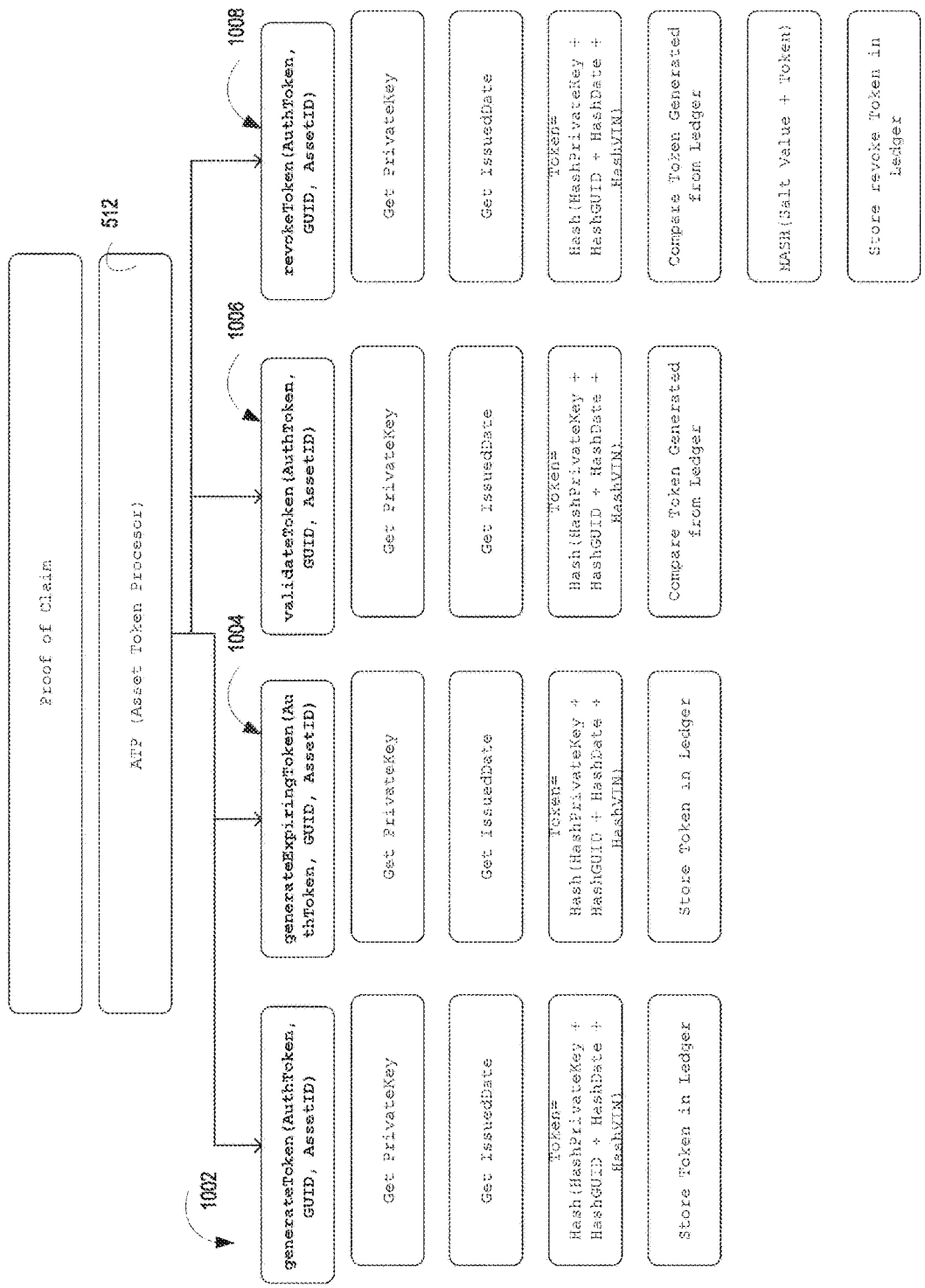
FIG. 10 shows a proof of claim algorithm that is processed by an asset token processor.

FIG. 10 shows the proof of claim algorithm that is accessed by the asset token processor 512. The proof of claim encapsulates four unique methods 1002-1008 that generate tokens, which are data structure consisting of a name; an identifier element with which the token is associated with, and a one-way hash of a preimage. In FIG. 10 the preimage comprises a sum of hashes of the user's private key, the user's universally unique identifier, the token's issue date, and when associated with a vehicle, a one-way hash of the vehicle's vehicle identifier number (VIN). The security behind the token is its one-way function computed on the unique aggregated input with the addition of certain attributes.

The expiring token shown in FIG. 10 contains the date and/or time after which a token becomes invalid. This may be thought of as a way of providing a third party with a limited amount of time to sell a vehicle, lease a vehicle (e.g., where the data and/or time corresponds to the term or the end of the lease) or a means to manage a fractional ownership (e.g., where the ownership may correspond to a rental term or portioned share of vehicle ownership). The validate token is a conditional type of token (e.g., a conditional token) that provides authentication for a corresponding action. A token validation occurs via a comparison to the token stored in the ledger only when an event or condition occurs. The revoked token type encapsulates a process that revokes tokens, such as when a title of an asset passes to a new owner. After a token is identified by a comparison to the token generated from the ledger, a new preimage is generated based on a new salt value (e.g., a random string) concatenated with the token. In this process, a new hash value replaces or in alternate systems, amends the original hash value in the ledger. Given the preimage changes, it is computationally infeasible for the values to match or find the preimage that hashes to that value without knowing the input. As a result, the token is revoked.

FIG. 11 illustrates pseudocode that generates and validates tokens generated by the system sending authentications across trust boundaries. The exemplary token software allows a modular approach for validating and producing the various token types used by product organization deployment modules, core module 324, and admin module 326 systems within a trust domain. The bundled and separately available token types may be generated and validated by the exemplary code. The section of pseudocode 1102 on the left in FIG. 11 illustrates an exemplary permissioned blockchain that comprises a base package that system's smart contract implements. In this exemplary pseudocode, each of the proof of claim tokens are generated based on the member's universally unique identifier and an asset identification (e.g., a vehicle identification number, phone number, an airplane tail number, a real estate listing number, etc.). The second exemplary pseudocode 1104 shown on the right in FIG. 11 validates the authorized tokens.

Figure 12:
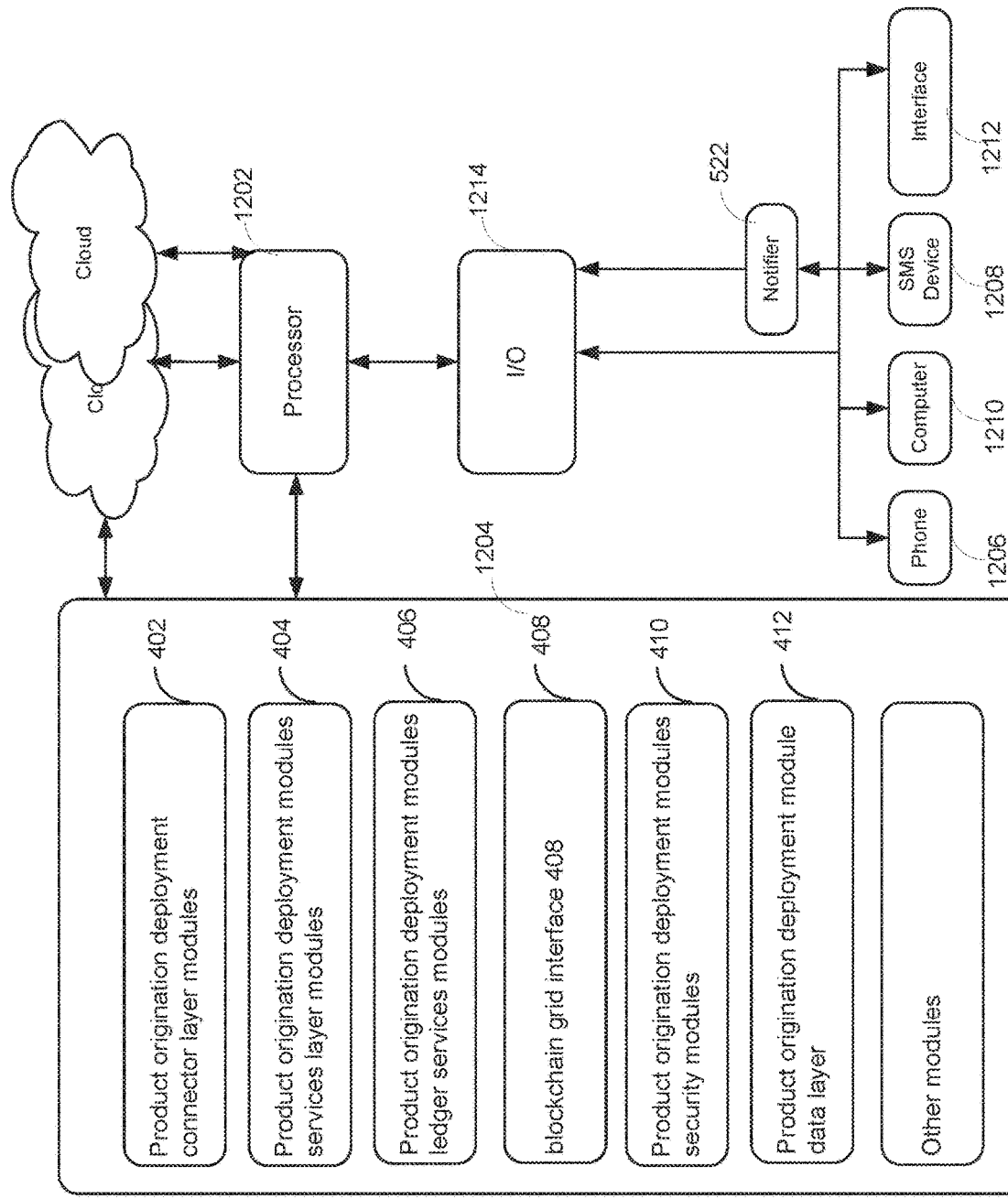
FIG. 12 is a block diagram of an alternate system that execute the process and transmits system functionality described herein and shown in FIGS. 1-11 and 13.

FIG. 12 is a block diagram of a system that may execute the process flows and system functionality described above and those shown in FIGS. 1-11 and 13 automatically. The system comprises a processor 1202, a non-transitory media, such as a memory 1204 (the contents of which are accessible and are executable by the processor 1202), a notifier device 522, and an I/O interface 1214. The I/O interface 1214 connects devices and points of interaction, such as the phone 1206, a short message service (SMS) enabled device 1208, the computer 1210 and/or an interface 1212 (e.g., a human machine interface or HMI), to local and/or remote applications, such as, for example, additional local and/or remote title services. The memory 1204 store instructions, which when executed by the processor 1202, causes the system to render some or all of the functionality associated with registering assets such as a vehicle. The memory 1204 stores instructions, which when executed by the processor 1202, causes the system to render the functionality associated with the product organization deployment module security modules 410, product organization deployment connector layer modules 402, product organization deployment modules services layer modules 404, product organization deployment modules ledger services modules 406, a product organization deployment module data layer 412, blockchain grid interface 408, and the other modules shown in FIGS. 1-11 and 13 and described herein.

The memory 1204 and/or storage disclosed may retain an ordered listing of executable instructions for implementing the functions described above in a non-transitory computer code. The machine-readable medium may selectively be, but is not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random-Access Memory (RAM), a Read-Only Memory (ROM), an Erasable Programmable Read-Only Memory (EPROM or Flash memory), or a database management system. The memory 1204 may comprise a single device or multiple devices that may be disposed on one or more dedicated memory devices or disposed on a processor or other similar device and alternatively, a memory of any type.

Figure 13:
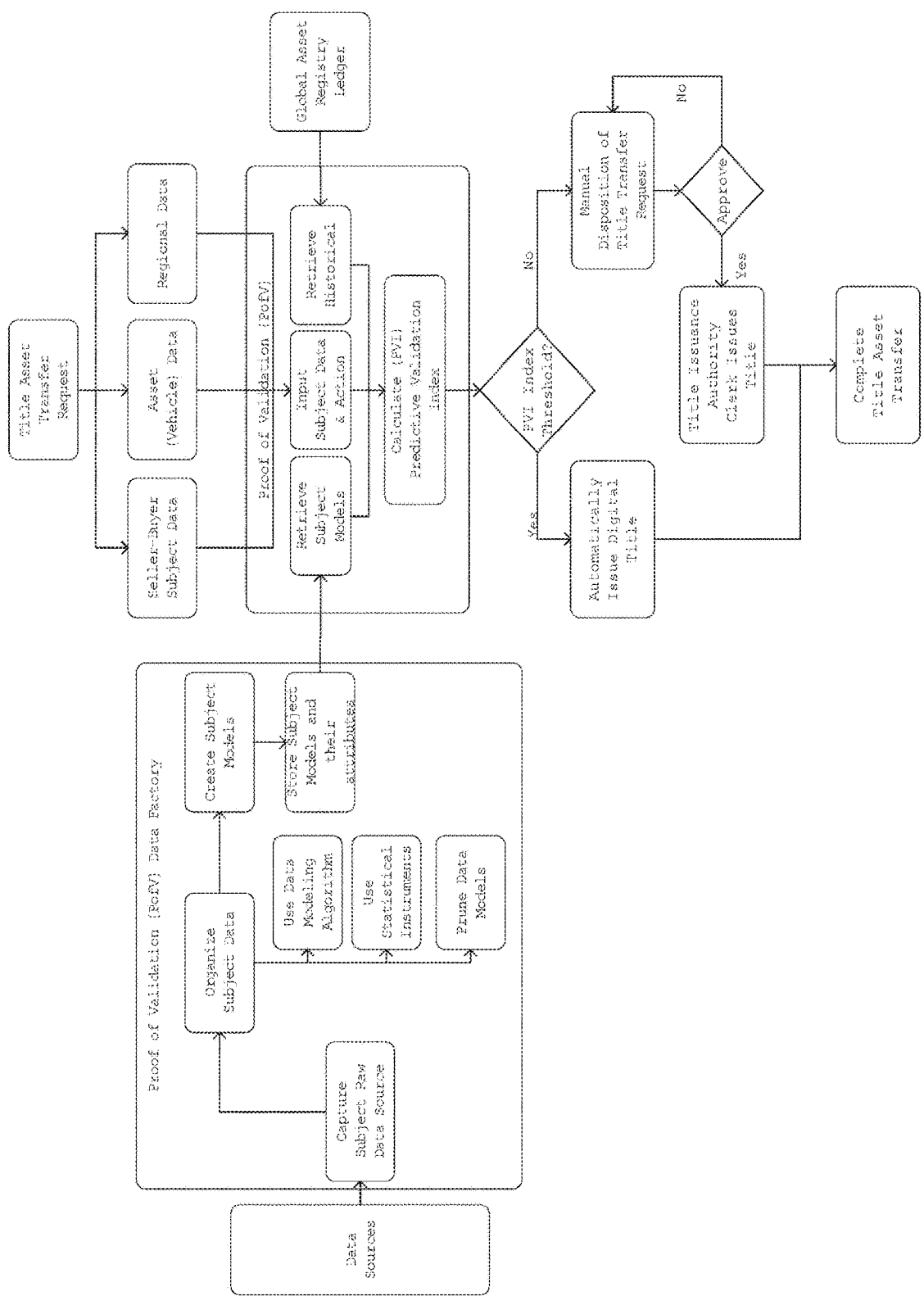
FIG. 13 is a data flow of a proof of validation.

FIG. 13 is a data flow of a proof of validation modeling the derivation of the pvi index. Notable aspects show a data warehouse that may be distributed over several computers and may contain several databases and information from numerous sources in a variety of formats that are accessible via a server or a server cluster. Access to the warehouse is transparent to the user or device(s) that access it via commands to retrieve and analyze the information. Exemplary data service providers include the Federal Reserve, the National Highway Traffic Safety Administration (NHTSA), the National Oceanic and Atmospheric Administration (NOAA), the American Association of Motor Vehicle Administrators (AAMVA), state departments of motor vehicles (DMV), and private sources such as one or more commercial web-based service providers that supply vehicle history reports, such as Carfax, for example, multinational consumer credit reporting companies such Experian, for example, location technology providers such as TomTom, for example, etc.

Figure 14:
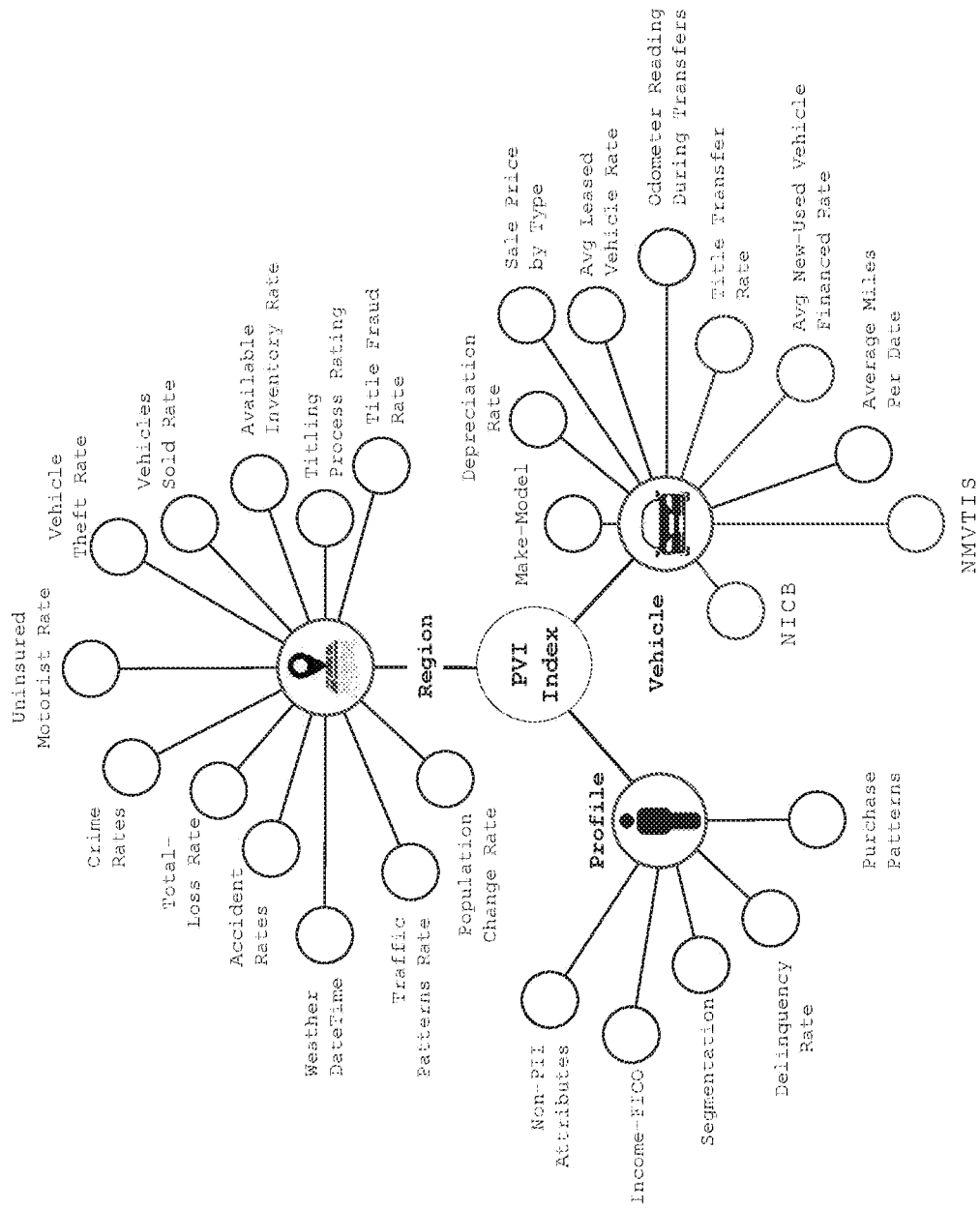
FIG. 14 is a proof of validation subject-attribute model.

With the data organized by subject matter, the systems generate models. Some models classify the data through normal distributions to find the mean values of attributes by subjects. The subjects may be based on non-personally identifiable information or profiles (non-pii information or profiles), vehicles, and/or regions, for example. The models may determine the correlation of attributes of non-pii profiles, vehicles, and regions to determine key attribute values that exhibit strong correlations. Exemplary correlations may include analyzing the total mileage between title transfers that are made on vehicles that travel 15,000 miles per year in regions where such traffic volumes are low for a daily commuter in a non-pii profile segment. Another correlation may reflect analyzing the total mileage between title transfers that are made on vehicles that travel 8,000 miles per year in regions where traffic volumes are high for a daily commuter in a non-pii profile segment but have higher than average reported mechanical problems. From recognized correlations, such as the exemplary correlations described above, models are generated. The models may use multi-dimensional (e.g., a star or snowflake, for example, as shown in FIG. 14) schema, relational, and columnar data.

The subject data set attributes may be stored in a mathematical graph data structure. In a use case, the attributes (e.g., the make and model of vehicle, the region or location, the weather conditions, odometer readings, and demographic segmentation information) establish the vertices linked through attribute value relationships. The structures improve the data extraction process and are used in probability and predictive calculations by leveraging the respective standard deviations to determine when subject attribute values fall outside of a trend.

In FIG. 13, the models process various data to render the predictive validation index value or pvi. Exemplary input data include the subject vehicle models, the historical data of global asset registry ledger, various inputs of the seller and buyer such as the region and vehicle attribute values, for example. In FIG. 13, the pvi index values ranges from 1 to 100 with a score falling within an upper level range, such as a range of about 80 to 100 indicating a high probability that a requested registration is valid.

In practice, each issuance authority may establish their own unique threshold values or ranges to process a title. For example, a title having an associated value that falls within a range of 75-100 will result in an automatic transfer of title in some systems, a value that falls with a range of 50-74 will prompt a manual review of title in some systems, and a value that falls within a range 0-49 will result in an automatic rejection of a title in some systems.

Figure 15:
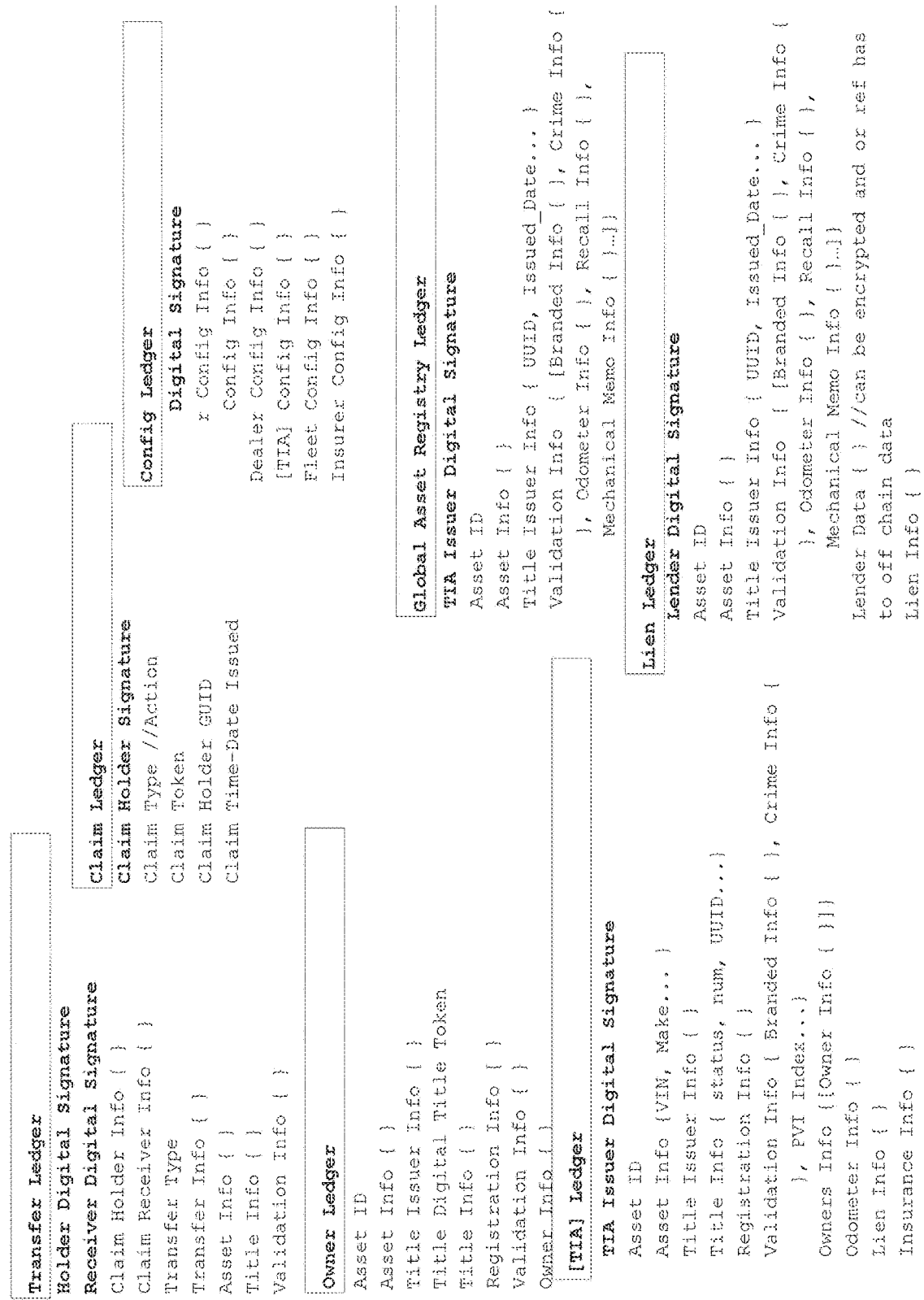
FIG. 15 an exemplary data definition by ledger type.
Figure 16:
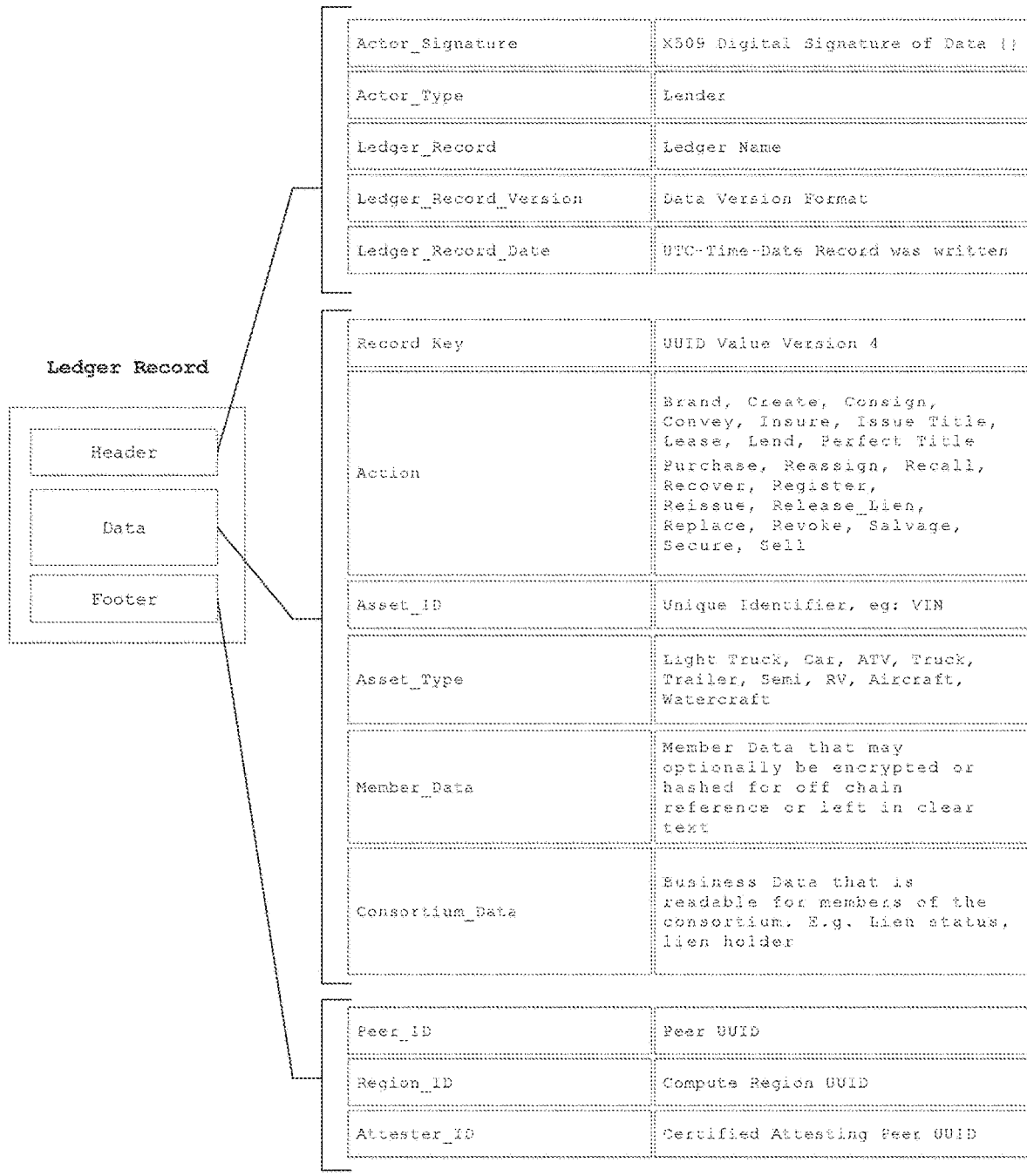
FIG. 16 is a ledger data record structure.

FIG. 15 illustrates an exemplary data definition by ledger type that is extensible and backward compatible. FIG. 16 illustrates a ledger data record structure. FIG. 17 illustrates a lien ledger record. The ledger data record consists of three objects: Header, Data, and Footer. The header stores the actor's digital signature of the data block. The Actor_Type data object denotes a consortium member type (e.g., lender, dealer, insurer, owner, issuance authority), Fleet, etc. The Ledger_Record data object identifies the LedgerName. The Ledger_Record_Version object identifies the record version etc. In use, the Ledger_Record_Date object retains the time that a record was recorded on the Ledger in a UTC Time Date format.

The system supports many types of titled asset actions that are identified by additional objects. In FIG. 15, the Data blocks object contains the record key unique identifier using a unique user identification format. The Action object depicts the requested processing and ensures the proper business process rules are followed. Further, the Asset Info object contains the complete details of the asset processed.

FIG. 18 illustrates an exemplary global asset registry ledger (GRL) that records titles transfer activities, from the MCO to the authority that issued the certificate of title. The GRL also contains objects that identify the current issuing authority such as a state's DMV. In FIG. 18, the GRL maintains the history of the asset, title transfers, and any validation changes, e.g., including objects that identify odometer replacement, and/or recall notices issued by the manufacturer.

The GRL records the issuer reference data from the issuance authority. The records may include lien status, title status, etc., without owner info. The owner info object is stored in the issuance authorities' respective ledgers. The issuance of a claim token through the proof of claim process herein allow a manufacturer, for example, to send a notice of recall. This feature allows issuance authorities to govern and control access to their title data as well as establish the number of inquiries permitted and or duration that they may occur. Additionally, some GRLs associate and maintain a branded status (e.g., a distinctive description identifying vehicle status, such salvage, salvage-rebuilt, etc.) of a vehicle. A salvage title, for example, is a form of vehicle title branding, which notes that the vehicle has been damaged and/or deemed a total loss by an insurance company that paid a claim on it. The criteria for determining when a salvage title is issued differ considerably by each issuing authority, state, province or territory, thus, it is valuable to keep track of an assets branded status. Thus, once a branded status is recorded it is not removed even if the next issuance authority governing a registration does not recognize it. Thus, the disclosed system guards against "title washing", whereby an owner may retitle in a state where a branded status is not tracked. Further, the GRL ensures that a branded status, odometer readings, and title transfer histories in a vehicle application, for example, are maintained regardless of the title authorities' rules and tracking processes.

Figure 19:
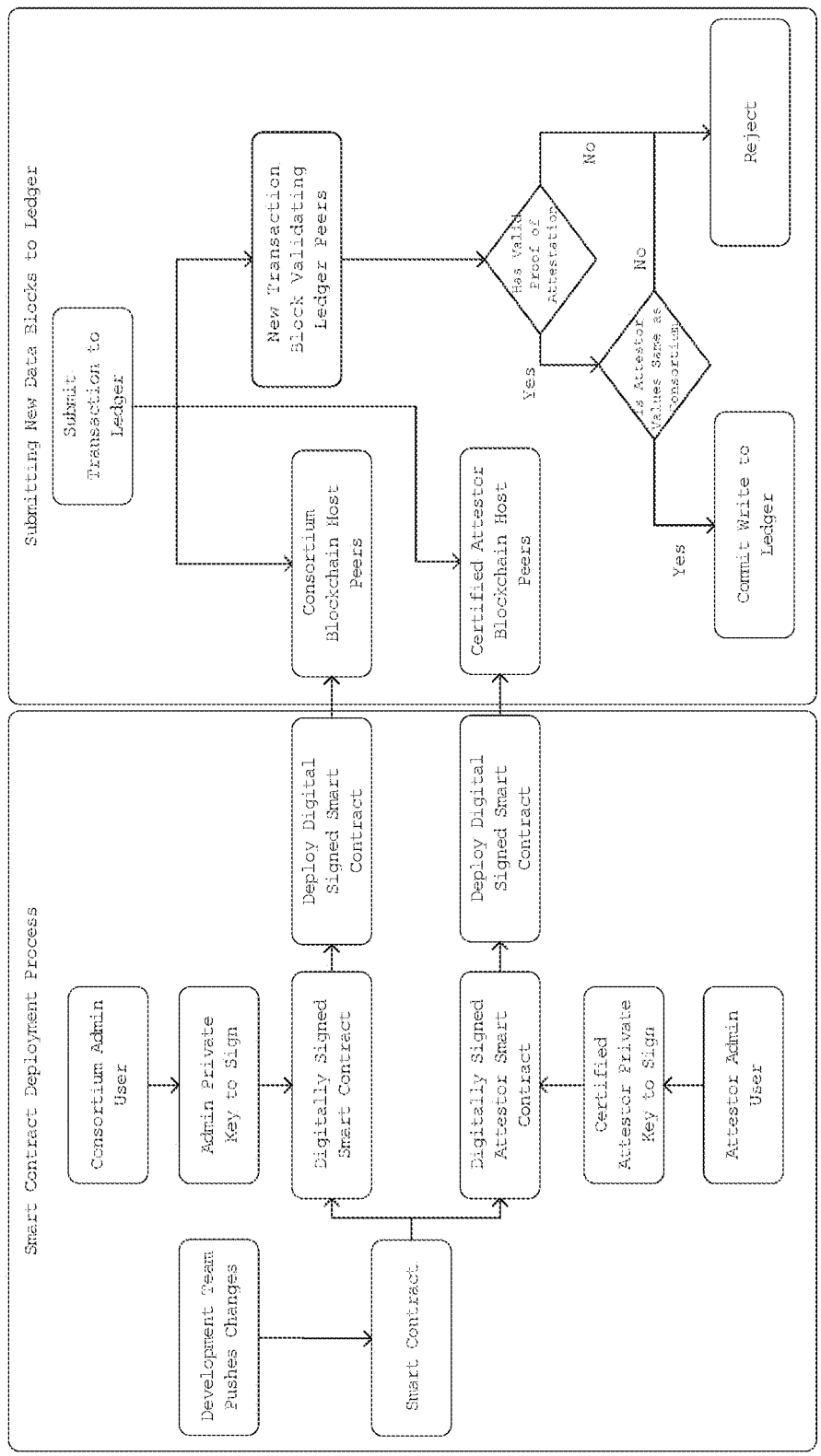
FIG. 19 shows proof of attestation flows.

FIG. 19 shows two proof of attestation flows. Before new or modified smart contracts are accepted, they are digitally signed by the attestor's private key. To complete a transfer, the submitting system must obtain a valid digital signature of the transaction before submitting the transactions to validating ledger peers. The validating ledger peers verify that proper proof attestations have occurred by inspecting the attestor's digital signatures. The validating ledger peers compare transaction responses from a consortium peer and the certified attestor peer to ensure the same process program was executed. The disclosed methods prevent unauthorized submissions of smart contracts without attestors certifying the changes.

When functions, steps, etc. are said to be "responsive to" or occur "in response to" another function or step, etc., the functions or steps necessarily occur as a result of another function or step, etc. It is not sufficient that a function or act merely follow or occur subsequent to another. Further, the term "engine" generally refers to a device, processor, and/or program executed by a hardware processor that manages and manipulates data as programmed to execute the functionality associated with the device. Computer-mediated technology enables human communication that occurs through two or more electronic devices. The devices may provide input from various sources including, but not limited to, audio, text, images, video, etc. A session is the time during which a program accepts input and processes information. For managing titles, it is the time during which the user transacts with a product organization deployment module or an asset transfer system rather than the entire time the user is accessing a title issuance authority site. The term "about" encompasses variances between one and five percent or an exact percent in that range that excludes other percentages in that range that may be associated with the particular variable.

While each of the systems and methods shown and described herein operate automatically and operate independently, they also may be encompassed within other systems and methods including any number of iterations of some or all of the process used to recognize input, render recognized results, and/or render an output such as a title registration, for example. Alternate systems may include any combination of structure and functions described or shown in one or more of the FIGS. These systems are formed from any combination of structures and functions described. The structures and functions may process the same, additional, or different input and may include the data integrations from multiple distributed sources to provide real time or near real time registrations and related activities. Alternate systems illustratively disclosed herein may be practiced in the absence of any element and functionality which is not specifically disclosed herein. In some alternate systems, when elements and/or functions are not disclosed herein, those alternate systems are devoid of or operate in the absence of those non-disclosed elements and/or functions. In yet another alternate system, the disclosed elements and functions are recited individually, rather than as an inseparable whole. In these alternate systems, one or more but not all of the recited elements and/or functions disclosed herein may be completely lacking or may be excluded from these alternate systems.

The functions, acts or tasks illustrated in the FIGS. or described herein may be executed in response to one or more sets of logic or instructions stored in or encoded on non-transitory computer readable media or non-transitory machine-readable medium. The functions, acts, or tasks are independent of the particular type of instructions set, storage media, processor or processing strategy, and may be performed by software, hardware, integrated circuits, firmware, micro code and the like, operating alone or in combination.

The disclosed systems efficiently process certificates and titles that establish a legal owner of an asset. The systems provide in-state and out-of-state processing that facilitate the registration and the fast release of titles by connecting issuance authorities to remote entities and interfacing highly secure automated workflows. The systems connect issuance authorities and financial service providers to small and large retail operations that include car dealers, dealer networks, first-line business partners, first-line service providers, and second-line business partners.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. A computer-implemented method of issuing a vehicle title that protects against title washing, comprising:
    receiving, by a computing system, a request to issue a title for a vehicle, the request including vehicle data comprising a vehicle identification number (VIN);
    querying a blockchain-based global asset registry ledger (GRL) to retrieve historical title records associated with the VIN;
    calculating, based on the historical title records and one or more external data sources, a predictive validation index (PVI) value representing a risk score of title fraud or data manipulation;
    determining, based on the PVI value, whether additional verification or attestation is required;
    instantiating a smart contract that enforces a proof of attestation policy, wherein the policy specifies a threshold number of endorsements required from certified peers based on the PVI value;
    receiving digital attestations from one or more certified peer nodes on a blockchain network, the attestations including cryptographically signed validations of title data;
    upon satisfying the proof of attestation policy, executing the smart contract to commit a new title issuance transaction to the blockchain network; and
    generating a digital title token representing the issued vehicle title issued as a result of committing the new title issuance transaction, wherein the digital title token is stored on the blockchain network and linked to the VIN.

2. A system for issuing a vehicle title that guards against title washing, comprising:
    one or more processors;
    a non-transitory memory storing instructions that, when executed by the one or more processors, cause the system to:
    receive a request to issue a title for a vehicle, the request including vehicle data comprising a vehicle identification number (VIN);
    query a blockchain-based global asset registry ledger (GRL) to retrieve historical title records associated with the VIN;
    calculate, based on the historical title records and one or more external data sources, a predictive validation index (PVI) value representing a risk score of title fraud or data manipulation;
    determine, based on the PVI value, whether additional verification or attestation is required;
    instantiate a smart contract that enforces a proof of attestation policy, wherein the policy specifies a threshold number of endorsements required from certified peers based on the PVI value;
    receive digital attestations from one or more certified peer nodes on a blockchain network, the attestations including cryptographically signed validations of title data;
    upon satisfying the proof of attestation policy, execute the smart contract to commit a new title issuance transaction to the blockchain network; and
    generate a digital title token representing the vehicle title issued as a result of committing the new title issuance transaction, wherein the digital title token is stored on the blockchain network and linked to the VIN.

3. A non-transitory computer-readable medium storing instructions for issuing a vehicle title that protects against title washing, the instructions when executed by a processor, cause the processor to perform a method comprising:
    receiving, by a computing system, a request to issue a title for a vehicle, the request including vehicle data comprising a vehicle identification number (VIN);
    querying a blockchain-based global asset registry ledger (GRL) to retrieve historical title records associated with the VIN;
    calculating, based on the historical title records and one or more external data sources, a predictive validation index (PVI) value representing a risk score of title fraud or data manipulation;
    determining, based on the PVI value, whether additional verification or attestation is required;
    instantiating a smart contract that enforces a proof of attestation policy, wherein the policy specifies a threshold number of endorsements required from certified peers based on the PVI value;
    receiving digital attestations from one or more certified peer nodes on a blockchain network, the attestations including cryptographically signed validations of title data;
    upon satisfying the proof of attestation policy, executing the smart contract to commit a new title issuance transaction to the blockchain network; and
    generating a digital title token representing the vehicle title issued as a result of committing the new title issuance transaction, wherein the digital title token is stored on the blockchain network and linked to the VIN.

4. The method of claim 1, wherein the external data sources include a national vehicle title database, a vehicle theft database, and odometer reading records.

5. The method of claim 1, wherein the predictive validation index (PVI) is calculated using machine learning based on vehicle age, location history, salvage branding frequency, and prior lien records.

6. The method of claim 1, wherein the proof of attestation policy is dynamically adjusted based on the PVI value.

7. The method of claim 1, wherein the smart contract restricts title issuance unless at least one governmental title authority node provides an endorsement.

8. The method of claim 1, wherein the digital title token includes metadata comprising a cryptographic hash of the title data, a timestamp, and a unique token identifier.

9. The method of claim 1, further comprising encrypting the digital title token using a public key associated with a title issuance authority.

10. The method of claim 1, further comprising generating an immutable audit trail of all attestations and validations recorded in association with the new title issuance transaction.

11. The method of claim 1, wherein the request to issue a title is received via a secure application programming interface (API) exposed to a dealership or fleet management system.

12. The method of claim 1, wherein the GRL includes branded title history, lien status, and insurance salvage events.

13. The system of claim 2, wherein the blockchain network comprises a permissioned, consortium-based ledger including peers from at least one governmental agency, one lender, and one insurance provider.

14. The system of claim 2, further comprising a policy engine configured to evaluate jurisdiction-specific title issuance rules based on a geographic origin of the vehicle.

15. The system of claim 2, wherein the predictive validation index is stored in association with each blockchain transaction for future risk analysis.

16. The system of claim 2, wherein the one or more processors are configured to revoke or expire the digital title token based on post-issuance discovery of fraudulent activity.

17. The method of claim 1, further comprising receiving a title issuance confirmation from the blockchain network and transmitting the confirmation to a user interface associated with a dealership, lender, or buyer.

18. The method of claim 1, wherein the certified peer nodes comprise both governmental and private sector entities, each authorized by a certificate authority.

19. The method of claim 1, wherein the smart contract defines a timeout period for receiving attestations, and automatically invalidates the transaction if the threshold is not met within the period.

20. The method of claim 1, wherein the generating issuance of the digital title token automatically triggers an update to an ownership ledger and a lien ledger maintained on the blockchain network.

* * * * *